(12) United States Patent
Hikichi

(10) Patent No.: US 8,924,586 B2
(45) Date of Patent: Dec. 30, 2014

(54) MANAGEMENT DEVICE IN DISTRIBUTING INFORMATION, MANAGEMENT METHOD AND MEDIUM

(75) Inventor: Kenji Hikichi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 820 days.

(21) Appl. No.: 12/764,255

(22) Filed: Apr. 21, 2010

(65) Prior Publication Data

US 2010/0274845 A1 Oct. 28, 2010

(30) Foreign Application Priority Data

Apr. 22, 2009 (JP) ................................ 2009-104560

(51) Int. Cl.
G06F 15/173 (2006.01)
G06F 15/16 (2006.01)
H04N 21/239 (2011.01)
H04N 21/472 (2011.01)
H04N 21/63 (2011.01)
H04L 29/08 (2006.01)

(52) U.S. Cl.
CPC ..... *H04N 21/2393* (2013.01); *H04N 21/47202* (2013.01); *H04N 21/632* (2013.01); *H04L 67/2842* (2013.01); *H04L 67/1002* (2013.01)
USPC .......................................... 709/238; 709/231

(58) Field of Classification Search
USPC ....................................................... 709/208
See application file for complete search history.

(56) References Cited

U.S. PATENT DOCUMENTS

| | | | | |
|---|---|---|---|---|
| 6,006,264 A * | 12/1999 | Colby et al. | ................. | 709/226 |
| 6,965,604 B1 * | 11/2005 | Sato et al. | .................... | 370/401 |
| 7,061,500 B1 * | 6/2006 | Baldwin | ........................ | 345/582 |
| 7,324,555 B1 * | 1/2008 | Chen et al. | .................... | 370/468 |
| 7,548,948 B2 * | 6/2009 | Klemets et al. | ............... | 709/203 |
| 7,697,557 B2 * | 4/2010 | Segel | .............................. | 370/429 |
| 7,725,557 B2 * | 5/2010 | Klemets et al. | ............... | 709/213 |
| 7,904,562 B2 * | 3/2011 | Takase et al. | .................. | 709/226 |
| 2003/0236885 A1 | 12/2003 | Takeuchi et al. | | |
| 2004/0049579 A1 * | 3/2004 | Ims et al. | ....................... | 709/225 |
| 2006/0149786 A1 * | 7/2006 | Nishiyama | .................... | 707/200 |
| 2006/0209760 A1 * | 9/2006 | Saito et al. | ..................... | 370/331 |
| 2007/0244964 A1 * | 10/2007 | Challenger et al. | ........... | 709/203 |

(Continued)

FOREIGN PATENT DOCUMENTS

| | | |
|---|---|---|
| JP | 2001-263472 | 9/2001 |
| JP | 2001-313919 | 11/2001 |

(Continued)

OTHER PUBLICATIONS

Fielding et al "RFC 2616 Hypertext Transfer Protocol—HTTP/1.1" Network Working Group, Jun. 1999, p. 1-176.*

*Primary Examiner* — Karen Tang
(74) *Attorney, Agent, or Firm* — Katten Muchin Rosenman LLP

(57) ABSTRACT

A management device determines, in response to a request, given from a requester terminal included in a plurality of terminals, for determining an information distributor to distribute request target information, any one of a server and a relay terminal to retain the request target information as the request target information distributor, and instructs the requester terminal and the relay terminal determined to be the distributor to determine, based on a status of a route which connects the server, the relay terminal and the requester terminal, whether the request target information can be held or deleted after having the request target information distributed.

8 Claims, 20 Drawing Sheets

(56) References Cited

U.S. PATENT DOCUMENTS

| | | |
|---|---|---|
| 2008/0005163 A1* | 1/2008 | Bauchot et al. ............ 707/103 Y |
| 2008/0005273 A1* | 1/2008 | Agarwalla et al. ............ 709/217 |
| 2008/0112326 A1* | 5/2008 | Krishnakumar et al. ..... 370/238 |
| 2008/0140937 A1* | 6/2008 | Nalawade et al. ............ 711/119 |
| 2008/0209133 A1* | 8/2008 | Ozer et al. .................... 711/146 |
| 2008/0215755 A1* | 9/2008 | Farber et al. ................. 709/245 |
| 2009/0113068 A1* | 4/2009 | Fujihira et al. ............... 709/231 |
| 2009/0144388 A1* | 6/2009 | Gross et al. ................... 709/213 |
| 2009/0182836 A1* | 7/2009 | Aviles et al. ................. 709/213 |
| 2009/0198899 A1* | 8/2009 | Revanuru ..................... 711/128 |
| 2009/0210549 A1* | 8/2009 | Hudson et al. ............... 709/231 |
| 2009/0313436 A1* | 12/2009 | Krishnaprasad et al. ..... 711/129 |
| 2010/0011061 A1* | 1/2010 | Hudson et al. ............... 709/204 |
| 2010/0106914 A1* | 4/2010 | Krishnaprasad et al. ..... 711/143 |
| 2010/0185728 A1* | 7/2010 | Erickson ....................... 709/203 |
| 2011/0035430 A1* | 2/2011 | Hayward ...................... 709/202 |
| 2011/0173436 A1* | 7/2011 | Vanheyningen et al. ..... 713/150 |
| 2011/0219120 A1* | 9/2011 | Farber et al. .................. 709/226 |
| 2012/0057456 A1* | 3/2012 | Bogatin et al. ............. 370/230.1 |

FOREIGN PATENT DOCUMENTS

| | | |
|---|---|---|
| JP | 2002-26942 | 1/2002 |
| JP | 2003-122658 | 4/2003 |
| JP | 2006-172296 | 6/2006 |
| JP | 2007-265172 | 10/2007 |
| JP | 2007-274244 | 10/2007 |
| JP | 2007-336396 | 12/2007 |

* cited by examiner

FIG.9

| TERMINAL NUMBER | CONTENT NUMBER | CACHE DUTY |
|---|---|---|
| TERMINAL 1 | CONTENT 3 | 1 (ON) |
| TERMINAL 2 | CONTENT 3 | 0 (OFF) |
| TERMINAL 3 | CONTENT 3 | 1 (ON) |
| TERMINAL 4 | CONTENT 3 | 0 (OFF) |

CACHE DUTY INFORMATION (RELATED TO CONTENT 3)

FIG.11

ACCESS INFORMATION

| TERMINAL NUMBER | IP ADDRESS |
|---|---|
| TERMINAL 1 | 192.168.1.1 |
| TERMINAL 2 | 192.168.1.2 |
| TERMINAL 3 | 192.168.2.3 |
| TERMINAL 4 | 192.168.2.4 |

FIG.10

FREE BAND INFORMATION

| LINK ID | FREE BAND |
|---|---|
| DISTRIBUTION SERVER, R1 | 10 |
| R1, R2 | 5 |
| R1, R3 | 5 |
| R2, TERMINAL 1 | 8 |
| R2, TERMINAL 2 | 10 |
| R3, TERMINAL 3 | 8 |

← SET ROUTER/TERMINAL TUPLE AT BOTH ENDS OF LINK AS ID

FIG.13

RELAY TERMINAL INFORMATION

| TERMINAL NUMBER | CONTENT NUMBER |
|---|---|
| 5 | 1 |
| 13 | 3 |
| 18 | 3 |
| 24 | 4 |

FIG.12

TERMINAL CACHE DUTY INFORMATION

| CONTENT NUMBER | CACHE DUTY |
|---|---|
| 1 | 1 (ON) |
| 2 | 0 (OFF) |
| 3 | 1 (ON) |
| 4 | 0 (OFF) |

FIG.20

PATH LIST

| ELEMENT NUMBER | 1 | 2 | 3 | 4 |
|---|---|---|---|---|
| PATH LIST (RELAY NODE) | DISTRIBUTION SERVER | R1 | R2 | R4 |
| PATH LIST (REQUESTER TERMINAL) | DISTRIBUTION SERVER | R1 | R3 | R6 |

CONFLUENT POINT

MANAGEMENT DEVICE IN DISTRIBUTING INFORMATION, MANAGEMENT METHOD AND MEDIUM

CROSS-REFERENCE TO RELATED APPLICATIONS

This application is based upon and claims the benefit of priority of the prior Japanese Patent Application No. JP2009-104560, filed on Apr. 22, 2009, the entire contents of which are incorporated herein by reference.

FIELD

The present invention relates to a technology of distributing information.

BACKGROUND

Nowadays, various items of information are distributed via a network to a user who utilizes a computer and other terminals. Then, with an increase in quantity of information to be distributed, a variety of technologies are proposed, which reduce concentration of a load on a server for distributing the information or on a network via which the information is transmitted. For example, a known technology is that the terminal has a relay function to share a part of the distribution load of the server.

The following system is exemplified as a first example in which the terminal has the relay function to share a part of the distribution load of the server. In the system in the first exemplification, a client as an information requester queries another client on the network about a desired content of a moving picture. Then, if a distribution-enabled response saying that the content can be distributed to this query is given, the requester client issues a request for distributing the moving picture content to the client which sent back the distribution-enabled response. Then, the requester client reproduces the received moving picture content. Further, if no response to the query is given from any clients, the requester client issues a request for distributing the desired content to the server.

The following system is exemplified as a second example in which the terminal has the relay function to share a part of the distribution load of the server. In the system in the second exemplification, as a first distribution mode, a device for distributing the content distributes by streaming in a broadcasting mode the content data to the terminals. Further, as a second distribution mode, between a plurality of terminal devices, one terminal device, which retains the content data, distributes the content data on the basis of a request for downloading the content data from another terminal device. Another system is proposed, which has both of the first distribution mode and the second distribution mode.

SUMMARY

As described above, the conventional technology has a contrivance for reducing the concentration of the load on the server or the network with which the server connects. As in the conventional technology, however, in order for the terminal to distribute the data, the terminal is required to have computer resources such as a storage capacity for retaining the data. Moreover, the terminal continues its operation to get ready for the distribution, resulting in consumption of energy resources such as electric power.

On the other hand, for reducing the storage capacity, in the case of adopting a method of deleting, e.g. the data with a less of access frequency, there is a possibility that this method might not conform to an original purpose for reducing the concentration of the load on the server or the network with which the server connects.

It is an aspect of a technology of a disclosure to restrain resources from being used on a terminal side while reducing concentration of a load on a distributor or a network in a system of distributing the information to the terminal via a network.

A management device of the disclosure can be exemplified for solving the problems. The management device controls a system including a server to distribute information and a plurality of terminals to receive the information and each capable of relaying the received information as a relay terminal. The management device determines, in response to a request given from a requester terminal included in a plurality of terminals, for determining an information distributor to distribute request target information, any one of a server and a relay terminal to retain the request target information as the request target information distributor. Further, the management device indicates the requester terminal and the relay terminal determined to be the distributor, based on a status of a route which connects the server, the relay terminal and the requester terminal, whether the request target information can be deleted or not after having the request target information distributed.

The object and advantage of the embodiment will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 9 is a diagram illustrating cache duty information.

FIG. 10 is a diagram illustrating free band information.

FIG. 11 is a diagram illustrating access information.

FIG. 12 is a diagram illustrating terminal cache duty information.

FIG. 13 is a diagram illustrating relay terminal information.

FIG. 20 is a diagram illustrating a path list including a video distribution server and a router.

DESCRIPTION OF EMBODIMENT(S)

An information system according to an embodiment will hereinafter be described with reference to the drawings. Configurations in the following embodiments are exemplifications, and the information system is not limited to the configurations in the embodiments.

First Working Example

Figure 1:
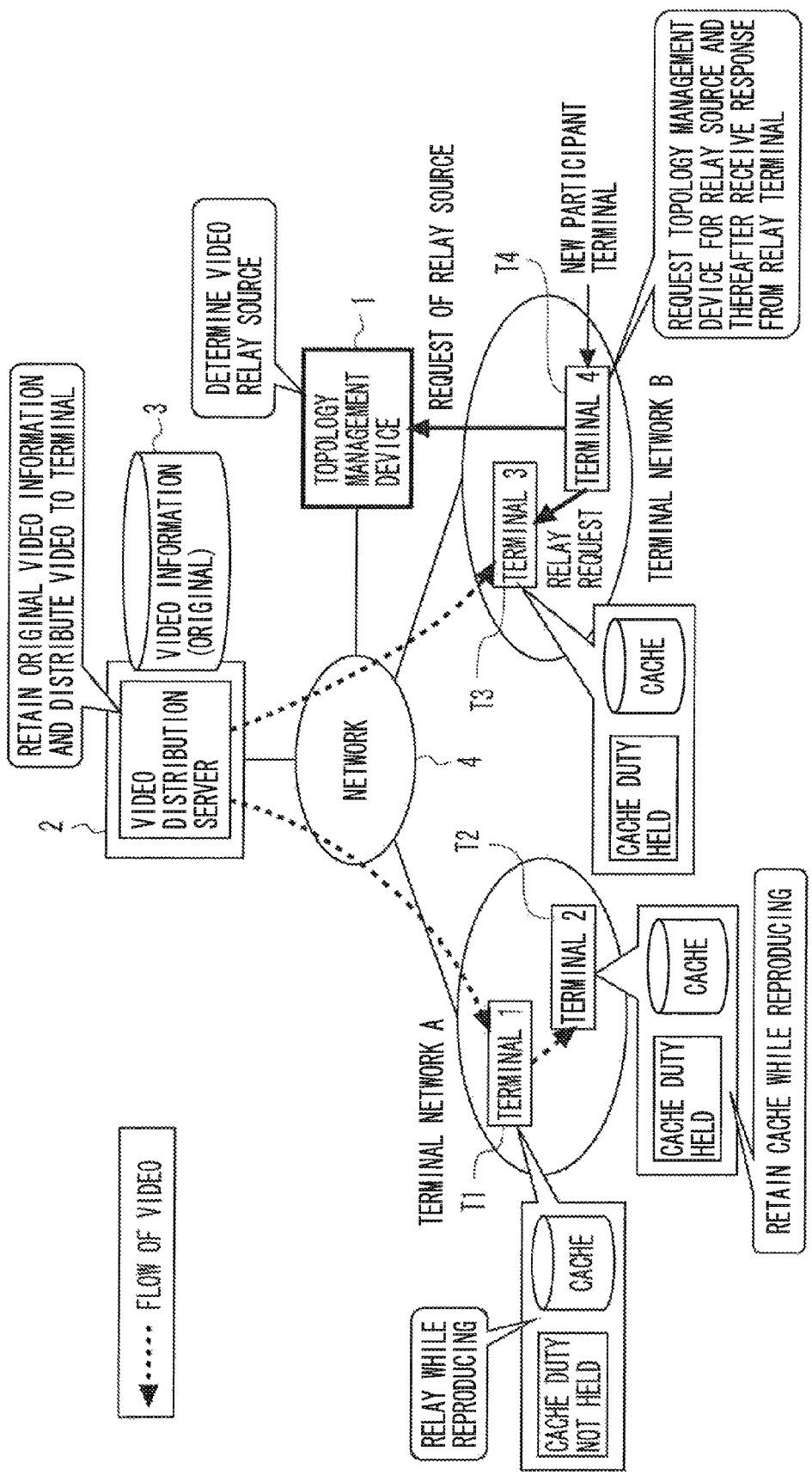
FIG. 1 is a diagram of a system architecture of an information system.

An information system according to a first working example will hereinafter be described with reference to FIGS. 1 though 3. FIG. 1 is an example of a system architecture of the information system according to the first working example. As in FIG. 1, the information system in the first working example includes a topology management device 1, a video distribution server 2 and a terminal group of terminals T1-T4 etc. The topology management device 1, the video distribution server 2 and the terminals T1-T4 etc are connected to each other via a network 4. The topology management device 1 corresponds to a management device, and the video distribution server 2 corresponds to a server. The topology management device 1 may be called a connection management device.

In the information system in the first working example, the terminals T1-T4 etc receive distribution of information from the video distribution server 2 or other terminals. In the first working example, a video (namely moving pictures) is assumed as the information to be distributed, and the video distribution server 2 is assumed as a video distribution source (distributor). A technology of the information system in the first working example is not, however, limited to the video distribution but can be applied to devices on the network via which a variety of information is transmitted and received. For example, the technology of the information system in the first working example can be applied to devices on the network via which a sound or music including voices is distributed in place of the video or together with the video. Further, the technology of the information system in the first working example can be applied to systems in which images such as static images and maps are distributed. In the first working example, the information distributed to the terminals T1-T4 etc through a user's operation is also referred to as request target information.

Moreover, the terminals T1-T4 etc are illustrated, however, the number of the terminals is not limited to "4". In the following discussion, in the case of giving a generic term to the terminals T1-T4 etc, simply a terminology "terminal" is used.

In the information system in the first working example, the terminal accepts the user's operation and provides the user with the video transmitted from the video distributor. In FIG. 1, the terminal T4 as a new participant terminal which accepts newly a service requests the topology management device 1 to decide a relay source terminal as the video distribution source. Then, the terminal T4 acquires information on the decided relay source from the topology management device 1. The relay source includes the video distribution server 2 and a terminal which received in the past the video distributed from the video distribution server 2 and retains the video for further distributing this video to other terminals. The terminal retaining the video for distributing this video to other terminals is called a relay node.

The video distribution server 2 retains video information 3 distributed to the terminal. The video information 3 of the video distribution server 2 is distributed at first to within the network 4 and corresponds to an original of the video information. This being the case, the video information 3 of the video distribution server 2 is also called the original video information 3. On the other hand, the video information, which is temporarily retained by the terminal receiving the original video information 3 or the relayed video information, is called "cache" (cached information). The video information will hereinafter be simply called the video. Further, the "relay" connotes that the video distribution server 2 distributes the original video to the requester terminal or that the relay node, which temporarily retains the video, distributes the video to the requester terminal.

In the information system in the first working example, the topology management device 1 instructs the terminal receiving the video to retain the received video. The "instruction to retain the received video" is called a "cache retaining duty-ON instruction". The "cache retaining duty-ON instruction" corresponds to an instruction to disable the request target information from being deleted after the request target information has been distributed. Conversely, a "cache retaining duty-OFF instruction" corresponds to an instruction to permit the request target information to be deleted after the request target information has been distributed. Further, the "cache retaining duty-ON instruction" and the "cache retaining duty-OFF instruction" correspond to indicating whether the request target information can be deleted or not.

The terminal connecting with the network 4 in the information system in the first working example, when the cache retaining duty is set ON, retains the received video. On the other hand, the terminal connecting with the network 4 in the information system in the first working example, when the cache retaining duty is set OFF, deletes the received video after an elapse of a predetermined period. What can be exemplified as the predetermined period is, e.g., a startup interval of a deleting process in a case where the deleting process of deleting the request target information is started up based on a timer. Another exemplification of the predetermined period is timing when the relay is terminated in such a case that the terminal serving as the relay node relays the request target information with the cache retaining duty being set OFF. The first working example does not, however, give any restrictions on the timing till the information with the cache retaining duty being set OFF is actually deleted.

On the other hand, the topology management device 1 sends an instruction to the relay node which relays the video remaining retained according to the cache retaining duty to another terminal to set a delete permission of the video distributed to another terminal through the relay. The "instruction given to the relay node to set the delete permission of the video" is called the "cache retaining duty-OFF instruction."

Further, the topology management device 1 has information for managing the terminal with the cache retaining duty being set ON and the terminal with the cache retaining duty being set OFF. The topology management device 1 accepts a request for determining the relay source of the video from within the terminals connecting with the network 4. Upon accepting the request for determining the relay source of the video, the topology management device 1 determines, with respect to the video with the relay source determining request being accepted, the relay source which relays the video from within the terminals with the cache retaining duty being set ON, and notifies the requester terminal of the determined relay source.

In FIG. 1, the terminal T4, which newly accepts the video distribution service, queries the topology management device 1 about the resource terminal. The terminal T3 and the terminal T4 build up a terminal network B. With respect to the query in the first working example, the terminal T4 specifies the distribution target video. Then, the topology management device 1 selects a proper terminal, e.g., the terminal T3 as the relay node from within the terminals which retain the specified video as the cache. Then, the topology management device 1 notifies the requester terminal T4 that the terminal T3 is determined to be the relay node. Moreover, the topology management device 1 sets OFF the cache retaining duty of the terminal T3 determined to be the relay node but sets ON the cache retaining duty of the requester terminal T4.

When the terminal T3 is specified as the relay node, the terminal T4 requests the terminal T3 serving as the relay node to relay the distribution target video. Then, when the requested video is relay-distributed to the terminal T4 from the terminal T3, the terminal T4 provides the relay-distributed video to the user according to, e.g., the user's instruction. After finishing the relay-distribution, the terminal T3 serving as the relay node deletes the already-distributed video because of the cache duty being set OFF after the predetermined period has elapsed. On the other hand, the requester terminal T4, with the cache retaining duty being set ON, retains the distributed video as the cache for the predetermined period.

The same process as the process between the terminal T3 and the terminal T4 as explained above is executed also between the terminal T1 and the terminal T2. In FIG. 1, the terminal T1 receives a request for relaying an in-reproduction video from the terminal T2. The terminal T1 and the terminal T2 configure a terminal network A. The terminal T1, while reproducing the video retained as the cache, relay-distributes the in-reproduction video with the relay request being received to the terminal T2. The terminal T1 sets OFF the cache retaining duty of the information that is relay-distributed. The information with the cache retaining duty being set OFF waits for its deletion and is then deleted at the predetermined timing after finishing the relay. On the other hand, the terminal T2, while reproducing the relay-distributed video from the terminal T1, retains the relay-distributed video as the cache.

Note that if there is no existence of the relay node retaining the video requested by the requester terminal, e.g., the terminal 4, the topology management device 1 instructs the terminal T4 to acquire the video from the video distribution server 2 in place of the relay node. This is because the video distribution server 2 retains the original video information 3.

The terminal included in the information system in the first working example, in the case of relaying as the relay node the video to other terminals, sets OFF the cache retaining duty of the video to be distributed. Then, just when finishing, as the relay node, the relay of the video to another terminal, the terminal functioning as the relay node deletes the cache of the video with the relay being finished at the predetermined timing. Even when the relay node deletes the cache of the video with the relay being finished, the relay destination terminal caches the received video, and hence it follows that the cache of the video with the relay being finished exists in the system.

In the process in FIG. 1, the cache retaining duty sequentially shifts to the requester from the relay source according to a video relay-distribution relation. The video with the cache retaining duty being set OFF is deleted at the predetermined timing. Accordingly, the cache shift to the requester from the video relay source enables unnecessary caches in the terminals within the network 4 to be reduced while avoiding concentrating a load on the distributor. For example, in the process in FIG. 1, it is feasible to reduce a possibility that the video cache exists redundantly in the relay source of the video and in the requester. Further, it is possible to reduce a possibility that the caches are concentrated on one relay source. Moreover, the terminal acquiring the video newly retains the cache and becomes the next relay source, and therefore the latest-accessed video is retained in the cache, which process conforms to a LRU (Least Recently Used) algorithm.

Figure 2:
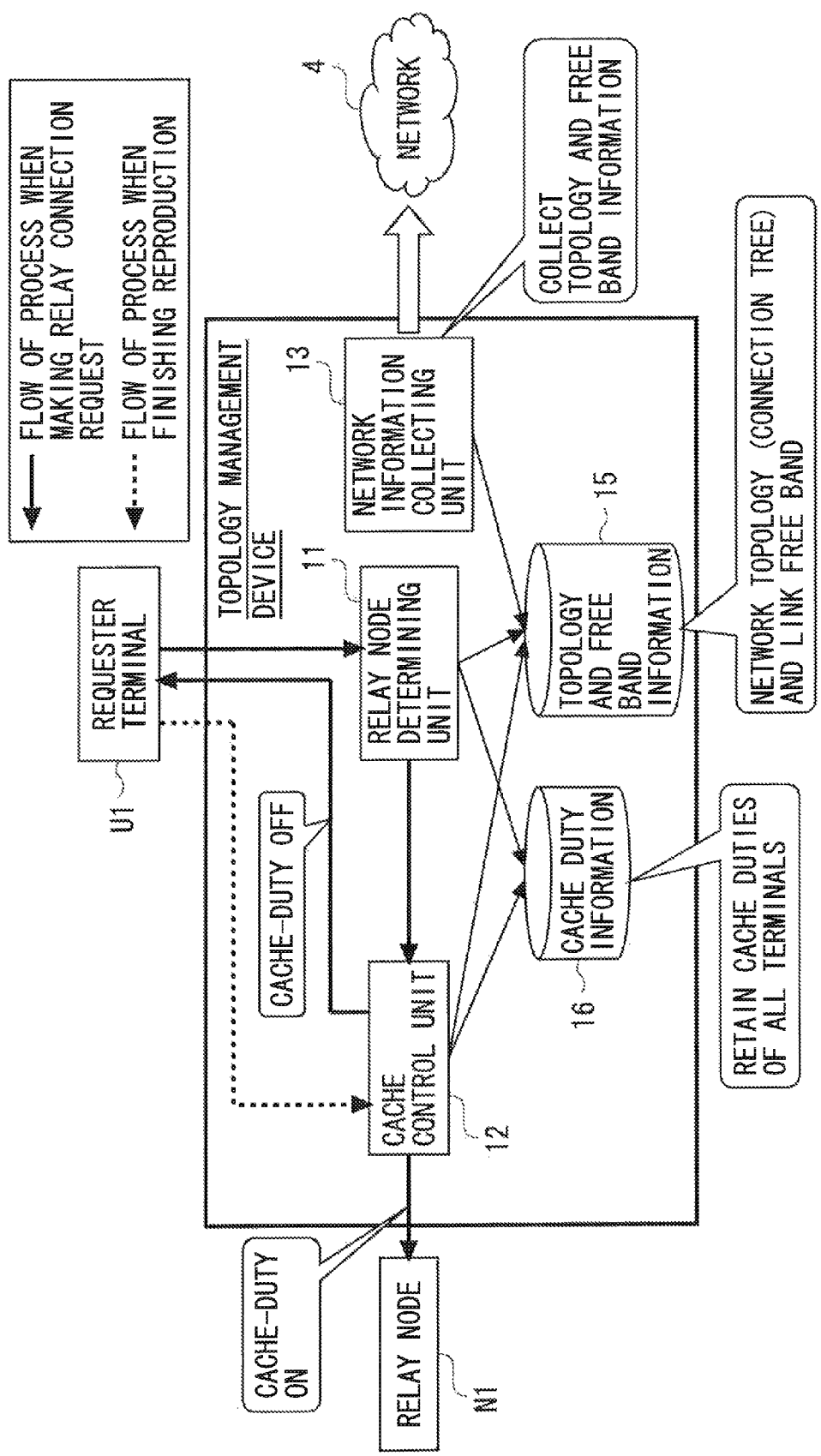
FIG. 2 is a diagram illustrating a detailed configuration of a topology management device.

FIG. 2 is a function block diagram illustrating a detailed configuration of the topology management device 1. In FIG. 2, the topology management device 1 accepts a relay node determining request from a requester terminal U1 and selects, e.g., a relay node N1. The relay node N1 corresponds to a relay terminal.

The topology management device 1 in FIG. 2 is a computer including, e.g., a Network Interface Card (NIC) defined as a connection interface with the network 4. Moreover, the topology management device 1 further includes a CPU (Central Processing Unit) and a storage device. The storage device may be configured to include a main storage device and an external storage device. The CPU of the topology management device 1 executes programs developed in an executable manner on the storage device, thereby functioning as a relay node determining unit 11, a cache control unit 12 and a network information collecting unit 13. The relay node determining unit 11 corresponds to a determining unit. The cache control unit 12 corresponds to a control unit. Further, the network information collecting unit 13 corresponds to an information collecting unit.

The programs executed by the CPU of the topology management device 1 are installed into the computer via the NIC or an attachable/detachable storage medium, etc. Furthermore, the topology management device 1 has topology (connection tree) and free band information 15 and cache retaining duty information 16 within the storage device. The topology and free band information 15 may be called connection tree and free band information.

The topology and free band information 15 is information about a connection relation between a router and the terminal and about a link free band, which information is collected by the network information collecting unit 13. The topology and free band information 15 corresponds to information of a route status including a location of the router and the band. The topology and free band information 15 is also called network information. Further, the cache retaining duty information 16 is information indicating whether each of the terminals connecting with the network 4 has the cache duty or not.

The relay node determining unit 11 determines any one of another terminal retaining the video and the video distribution server 2 as the video distributor. A method of determining the video distributor is not particularly restricted. For instance, the terminal becoming the video distributor may be selected based on the following standards from the cache retaining duty information 16 and the topology and free band information 15.

(1) The terminal having a larger free band of the route extending to the requester terminal U1 from a video distributor candidate terminal is selected to be the video distributor, i.e., the relay node N1. The condition may be, however, such that the free band of the route extending from the video distributor candidate terminal to the requester terminal U1 is larger than the free band of the route extending from the video distribution server 2 to the requester terminal U1.

(2) The terminal having a smaller hop count calculated as the number of routers existing on the route extending from the video distributor candidate terminal to the requester terminal U1 is selected as the video distributor, i.e., the relay node N1. The condition may be, however, such that the hop count on the route extending from the video distributor candidate terminal to the requester terminal U1 is smaller than the hop count on the route extending from the video distribution server 2 to the requester terminal U1.

The relay node determining unit 11 determines, from any one of the conditions (1) and (2) given above, the relay node N1 becoming the video distributor. Further, the relay node determining unit 11 may also determine the relay node N1 becoming the video distributor on the condition (1) that the free band is equal to or larger than the predetermine value and the condition (2) that the hop count is equal to or smaller than the predetermined value. Moreover, the relay node determining unit 11 may select the relay node N1 becoming the video distributor at random from the plurality of terminals each having the condition (1) that the free band is equal to or larger than the predetermined value and the condition (2) that the hop count is equal to or smaller than the predetermined value.

The cache control unit 12 executes updating the cache duties of the relay node N1 and the requester terminal U1. As described above, the relay node determining unit 11 determines the relay node N1 becoming the video distributor in response to the relay node determining request given from the requester terminal U1. Thereafter, the cache control unit 12 sets ON the cache duty of the requester terminal U1 but sets OFF the cache duty of the relay node N1. According to the cache duty instructions, the cache control unit 12 instructs the relay node N1 determined as the video distributor to permit the deletion of the post-distributing request target information, and instructs the requester terminal U1 receiving the distribution to disable the post-distributing request target information from being deleted, i.e., instructs the requester terminal U1 to continue to retain the request target information. Namely, the cache control unit 12 transfers, based on the relay-distribution relation, the cache duty to the requester terminal U1 from the relay node N1. The relay-distribution relation corresponds to a relation for transmitting or receiving request target information.

The cache control unit 12 notifies the terminal determined to be the relay node N1 by the relay node determining unit 11 that the same terminal is determined as the relay node N1 for distributing the video to the requester terminal U1 and that the cache duty is set OFF. With this cache duty-OFF notification, the relay node N1 sets OFF the cache duty information 16 on the self-terminal. On the other hand, the cache control unit 12, with the transfer of the cache duty, updates the cache duty information 16.

The network information collecting unit 13 acquires items of information on the topology and the free band of a link from routers and the terminals on the network 4. The topology is information representing a connecting relation between the routers and the terminals in a tree structure. The topology is also called connection tree. Further, the link is a transmission path between the device and the device such as the router and the terminal which perform the communications on the network 4.

Figure 3:
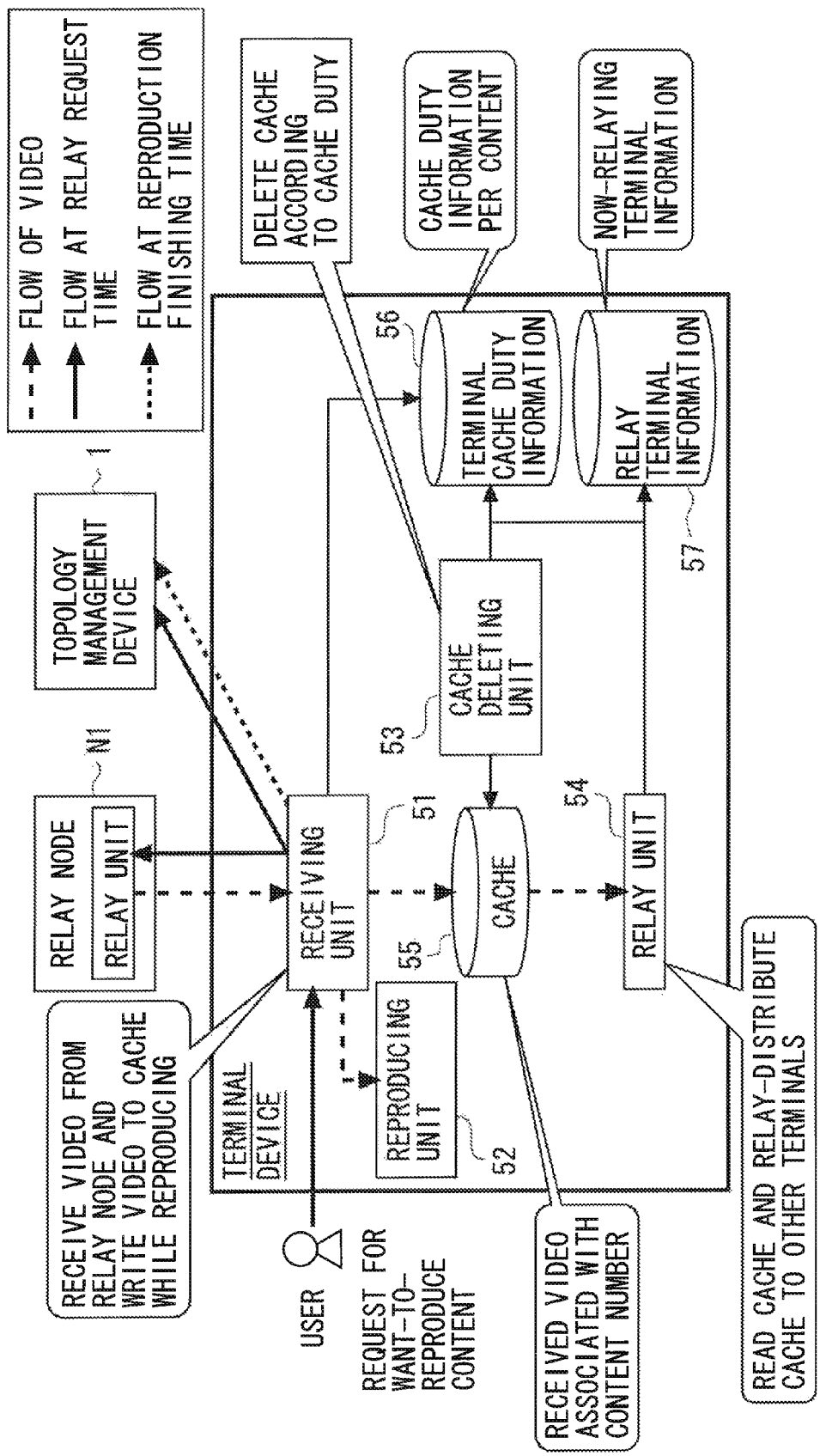
FIG. 3 is a diagram illustrating a detailed configuration of a terminal.

FIG. 3 illustrates a detailed configuration of the terminal. The terminal in FIG. 3 also includes, similarly to the topology management device 1, the connection interface such as the NIC with the network 4, the CPU and the storage device. The CPU of the terminal executes programs developed in the executable manner on the storage device, thereby functioning as a receiving unit (module) 51, a reproducing unit 52, a cache deleting unit 53 or a relay unit 54. The programs executed by the CPU of the terminal are installed into the computer via the NIC or the attachable/detachable storage medium etc. The cache deleting unit 53 corresponds to a deleting unit. Further, the terminal has, on the storage device, a cache 55, terminal cache duty information 56 and relay terminal information 57.

The cache 55 is an area, on the storage device, for temporarily retaining the received video. The information itself such as the video retained in the area on the storage device is, however, referred to also as the cache. Further, a process of storing the information as the cache in the area on the storage device is also termed "caching". Moreover, the terminal has, as cache management information, an address of the cache 55 stored with a content number for identifying the video and with the video specified by the content number. Accordingly, the terminal can read the video associated with the content number from the cache 55.

The terminal cache duty information 56 is information for specifying whether the cache duty on a per-video basis, accordingly, on a per-content-number basis is held or not. The terminal cache duty information 56 is stored, e.g., in a table format on the storage device.

The relay terminal information 57 contains information on the relay destination when further relaying the information received by the terminal. The relay terminal information 57 contains, e.g., the information on the relay destination to which the terminal currently relays the video, i.e., the information on the requester terminal U1 and contains the content number of the relayed video. The information on the requester terminal U1 contains, e.g., an address etc of the requester terminal U1 on the network 4. Moreover, the relay terminal information 57 may be contrived to include a terminal number for identifying the individual terminal and content information of the content relayed to the terminal specified by this terminal number. Then, the address on the network 4, which corresponds to the terminal number for identifying each terminal, may be retained as the terminal information in another table.

The receiving unit 51 receives, from the topology management device 1, the information about whether the cache duty is held or not, and updates the terminal cache duty information 56. In the first working example, when the terminal serving as the requester terminal U1 receives the video, the cache duty is set ON.

Moreover, the receiving unit 51, when the terminal functions as the requester terminal U1, requests the topology management device 1 to determine the distributor of the video specified by the content number. Then, the receiving unit 51 performs communications with the relay node N1 becoming the video distributor determined by the topology management device 1 or with the video distribution server 2 determined by the topology management device 1. In the example in FIG. 3, the receiving unit 51 receives the video from the relay node N1 and reproduces the video. Further, the receiving unit 51 writes the video received from the relay node N1 to the cache 55. In writing the video to the cache 55, the receiving unit 51 stores, in the cache management information, the content number of the video and an address of the cache 55 to which the video is written. Further, when finishing reproducing the video, the receiving unit 51 notifies the topology management device 1 that the reproduction is finished and that the cache duty is set OFF. Moreover, the receiving unit 51, with the end of the reproduction, sets OFF the cache duty of the video of which the reproduction is terminated in the terminal cache duty information 56. The cache of the video with the cache duty being set OFF is deleted in a deleting process at the predetermined timing, e.g., with the timer-based startup.

Accordingly, before finishing reproducing the video on the terminal, if the video relay request is not given from another terminal, the video cached in the cache 55 comes to a wait-for-deletion station. The cache duty of the video cached in the cache 55 may, however, be set OFF after an elapse of the predetermined period of time since the end of reproducing the video. The content count of the videos retained in the cache 55 is adjusted by controlling the predetermined period of time since the end of reproducing each of the videos.

The cache deleting unit 53 deletes the unnecessary video cache with, e.g., the timer-based startup. The unnecessary video cache in the first working example implies the cache of which the cache duty is set OFF and the relay-distribution has already been finished. Therefore, the cache deleting unit 53, when periodically started up on the basis of the timer, searches for the cache of which the cache duty is set OFF and the relay-distribution has already been finished from within the caches, and deletes the searched cache. This is because even when the cache duty is set OFF and if the now-relaying video is deleted, such a problem arises that the relay is interrupted.

A scheme in place of the timer-based startup is, however, that, e.g., the terminal functions as the relay node N1, and the cache deleting unit 53 may be started up when finishing the relay. Namely, when the relay unit 54 terminates the relay-distribution, a trigger signal may be transmitted to the cache deleting unit 53 to thereby start up the cache deleting unit 53. In any case, the first working example does not restrict the timing when the cache deleting unit 53 is started up.

With the operations described above, the relay node N1, which once relay-distributes the video, can delete the cache at a point of time when finishing the relay-distribution. The deletion of the unnecessary caches can lead to a decrease in storage capacity, and the terminal can reduce resources such as the storage device. Further, the terminal can transition to, e.g., a sleep status or a power saving mode, thereby enabling the power to be saved, because of having no necessity for newly relaying the video. Further, the cache duty is transferred to the requester terminal U1 from the relay node N1, and at least one piece of video information is thereby retained as the cache. Moreover, it is feasible to avoid concentrating the video distributor's load on the video distribution server 2 or the single relay node N1. Furthermore, the requester terminal U1 retaining the cache can be said to be the terminal which reproduces the video at the point of time after the relay node N1 relay-distributing the video reproduced the video. Hence, the cache of the requester terminal can be deemed to be the latest-accessed information, and the transfer of the cache conforms to the LRU algorithm.

As discussed above, the cache which may be deleted can be easily determined by checking whether both of the condition that the cache duty is set OFF and the condition that the relay-distribution has already been finished are established or not. Further, it is possible to easily check through the timer whether both of the condition that the cache duty is set OFF and the condition that the relay-distribution has already been finished are established or not.

Modified Example

In the first working example, the receiving unit 51 of the terminal updates the cache duty according to the notification of the cache duty from the topology management device 1. Namely, the topology management device 1 gives the cache duty-OFF notification to the relay node N1 which has finished the relay-distribution. On the other hand, the topology management device 1 gives the cache duty-ON notification to the requester terminal U1 which receives newly the video. Then, the requester terminal U1 with the cache duty being set ON retains the distributed video as the cache for the predetermined period and, after the elapse of the predetermined period, deletes the cache by setting OFF the cache duty of the self-terminal. The terminal side may, however, autonomously set ON/OFF the cache duty without giving the cache duty-ON/OFF notification from the topology management device 1.

For example, the relay node N1 finishing the relay-distribution sets OFF the cache duty of the self-terminal, and may further delete the cache of the video with the relay-distribution being finished at the predetermined timing. Moreover, the requester terminal U1 receiving the video from the video distributor may simply set ON the cache duty of the self-terminal. The cache duty of the terminal is updated without any intermediary of the topology management device 1 by setting OFF the cache duty of the terminal on the side of distributing the video and, while on the other hand, setting ON the cache duty of the terminal receiving the video. The cache control unit 12 of the topology management device 1, when indicating to the requester terminal U1 the information with respect to the relay node N1, may update the cache duty information 16 illustrated in FIG. 9. Namely, the cache control unit 12 of the topology management device 1 may update the cache duty information 16 on the premise that the cache duty of the relay node N1 with the relay-distribution being finished is set OFF and the cache duty of the terminal receiving the video is set ON.

Second Working Example

Figure 4:
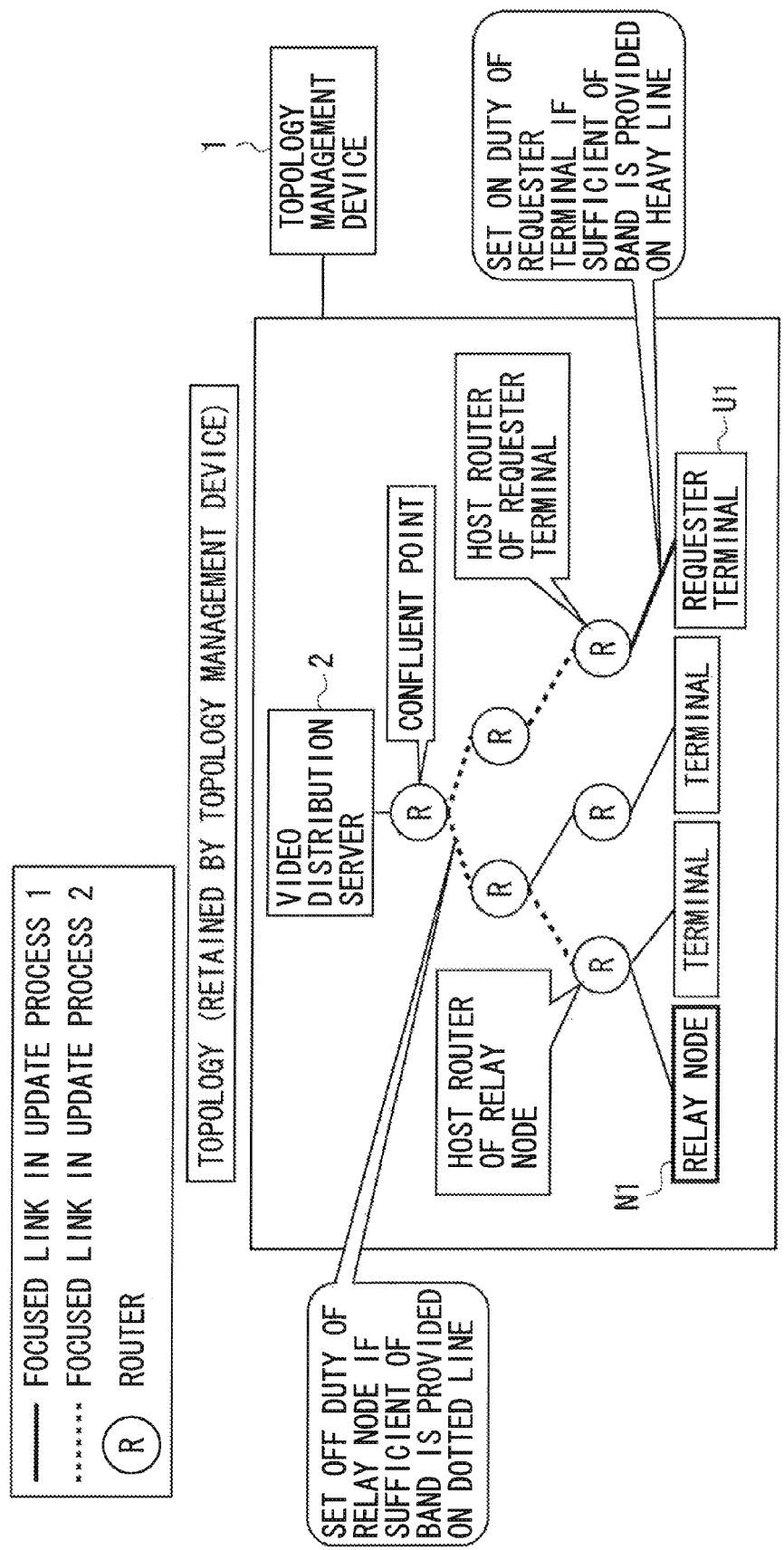
FIG. 4 is a diagram illustrating of a process of updating a cache duty according to a connection tree of a network and a free band.

A second working example will be described with reference to FIG. 4. FIG. 4 is a diagram illustrating a process of updating the cache duty in accordance with the topology of the network and the free band. In the cache duty updating method in the first working example, the cache duty is transferred based on the relay-distribution relation to the requester terminal U1 from the video distributor, e.g., the relay node N1. The way that the relay node N1 continues to hold the cache duty or the requester terminal U1 does not hold the cache duty may be rather capable of avoiding concentrating the load on the video distributor and reducing the terminal load in some cases depending on the status of the network 4. Such being the case, the information system updates the cache duty based on the status of the network 4.

The system architecture of the information system in the second working example is the same as in the first working example. In the second working example, however, the cache control unit 12 updates, based on the topology and free band information 15 collected by the network information collecting unit 13, the cache duties of the requester terminal U1 and of the relay node N1.

The topology and free band information 15 represents the connection tree expressing the network topology and the free band information accompanying the link of the connection tree. Note that the network information collecting unit 13 of the topology management device 1 collects the topology and free band information 15 according to a protocol such as Simple Network Management Protocol (SNMP). Other configurations and operations in the second working example are the same as in the case of the first working example. This being the case, the same components as those in the first working example are marked with the same numerals and symbols, and their explanations are omitted. Hereinafter, in the second working example, the cache duties are updated in an updating process 1 with respect to the requester terminal U1 and in an updating process 2 with respect to the relay node N1. The CPU of the topology management device 1 executes programs as the updating process 1 and the updating process 2, which are developed on the storage device.

In the updating process 1, the cache control unit 12 of the topology management device 1 in FIG. 2 updates the cache duty of the requester terminal U1. The cache control unit 12, if a sufficient free band is provided between the requester terminal U1 and a host router called a requester next router, sets ON the cache duty of the requester terminal U1. On the other hand, the topology management device 1, if the sufficient free band is not provided between the requester terminal U1 and the host router, sets OFF the cache duty of the requester terminal U1. Herein, the host router connotes a router which located first among routers on the route extending from the requester terminal U1 to the video distribution server 2 in the connection tree. The route is called a server route. The host router is called as a requester next router because the host router connects the requester terminal U1 to the server route at the first location on the server route from the requester terminal to the video distribution server 2. In FIG. 4, a path between the requester terminal U1 and the host router is depicted by a bold line. The path between the requester terminal U1 and the host router corresponds to a host router connection path.

If the link with which the requester terminal U1 connects or the path extending from the requester terminal U1 to the host router has no sufficient band, even when the requester terminal U1 caches the video, the cached video can not be efficiently relayed. The updating process 1 may be called a process of preventing the requester terminal U1 from holding the duty if unable to efficiently relay the video.

In the updating process 2, the relay node N1 continues to hold the cache duty under the condition that a path located upper steam side toward the video distribution server 2 from any one of the host router of the relay node N1 and the host router of the requester terminal U1 has no sufficient free band. Accordingly, when the sufficient free band is not provided on the upper stream side of the host router, the request from another terminal is prevented from reaching the upper stream side, e.g., the video distribution server 2 than the host router. The host router of the relay node N1 may be called a relay next router.

In the updating process 2, the cache control unit 12 of the topology management device 1 updates the cache duty of the relay node N1. To begin with, the topology management device 1 determines a point (confluent point) at which a route connecting the requester terminal U1 to the video distribution server 2 gets confluent with a route connecting the relay node N1 to the video distribution server 2 in the connection tree. Then, if the sufficient free band is provided between the host router of the relay node N1 and the confluent point and if the sufficient free band is provided between the host router of the requester terminal U1 and the confluent point, the topology management device 1 sets OFF the cache duty of the relay node N1. In the updating process 2, an expression "the sufficient free band is provided" connotes that the band necessary for distributing the video can be ensured.

While on the other hand, if the condition that the sufficient free band is provided between the host router of the relay node N1 and the confluent point and the condition that the sufficient free band is provided between the host router of the requester terminal U1 and the confluent point, are not satisfied, the topology management device 1 sets ON the cache duty of the relay node N1.

In FIG. 4, the path between the host router of the relay node N1 and the confluent point and the path between the host router of the requester terminal U1 and the confluent point are depicted by dotted lines. The path between the host router of the requester terminal U1 and the confluent point corresponds to a first segmental path. The path between the host router of the relay node N1 and the confluent point corresponds to a second segmental path. The route between the requester terminal U1 and the video distribution server 2 corresponds to a first server route. The route between the relay node N1 and the video distribution server 2 corresponds to a second server route. If the sufficient free band is provided in the network link depicted by the dotted line in FIG. 1, even when the deleting the cache of the relay node N1, the terminal connected to the network link depicted by the dotted line can receive the video that is the relay-distributed from the video distribution server 2. The updating process 2 is a process of determining whether the cache of the relay node N1 can be deleted or not in a way that focuses on the network link depicted by the dotted line in FIG. 1.

With the operations described above, the cache duty is updated corresponding to the network status, whereby it is feasible to realize the avoidance of the concentration on the video distributor and the deletion of the extra caches. Namely, as compared with the system in the first working example, the determination as to whether the cache duty of the requester terminal U1 is required or not can be made more finely corresponding to the network status in the updating process 1. Further, the determination as to whether the cache duty of the terminal functioning as the relay node N1 is required or not can be made more finely corresponding to the network status in the updating process 2.

Third Working Example

Figure 5:
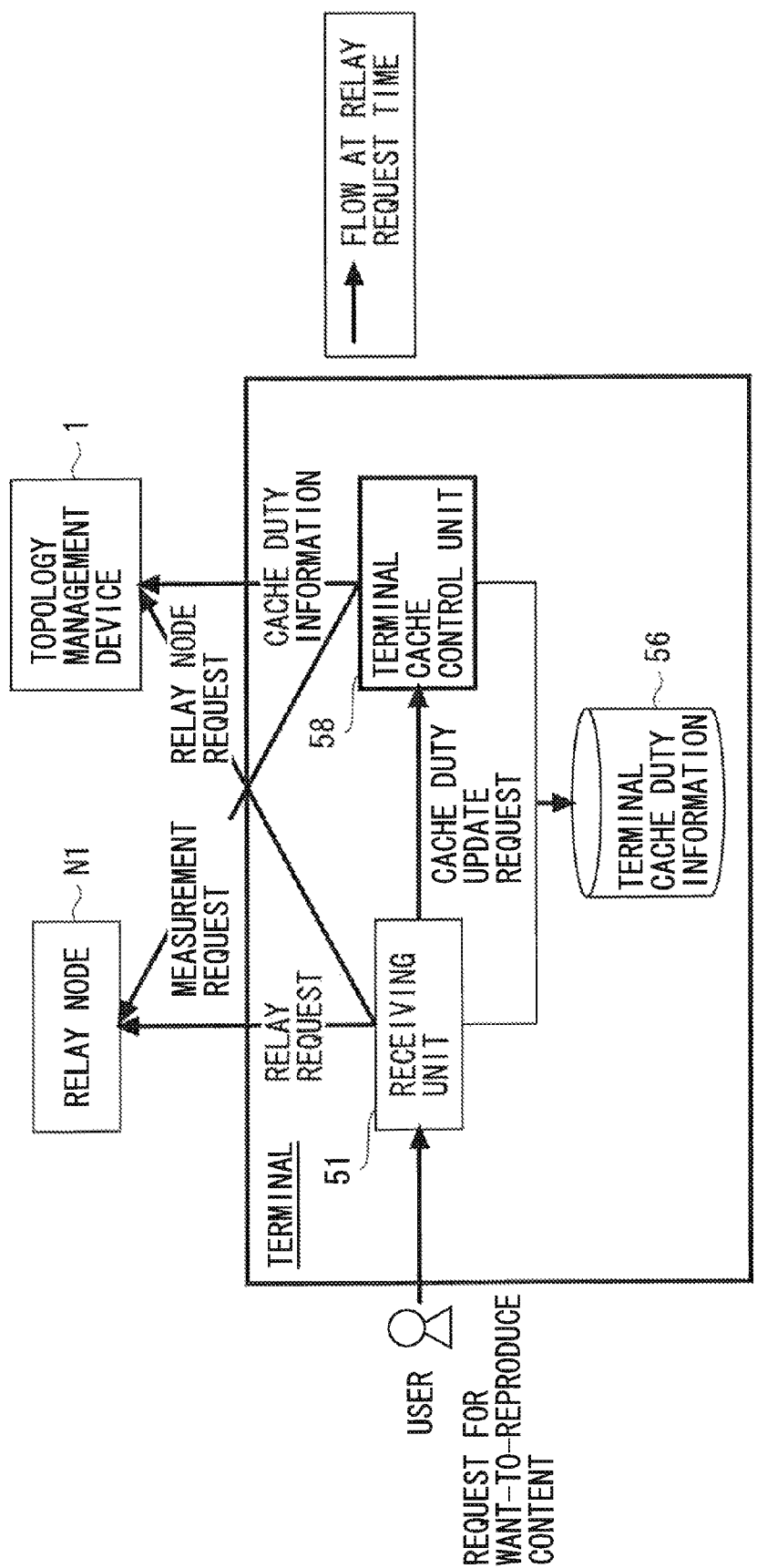
FIG. 5 is a diagram illustrating the configuration of the terminal in a system where the terminal performs cache control.

A third working example will be described with reference to FIG. 5. FIG. 5 is a diagram illustrating a configuration of the terminal in the system where the terminal performs the cache control. In the third working example, the topology management device 1 does not update the cache duty, but each terminal includes a terminal cache control unit 58 which updates the cache duty. Other configurations and operations in the third working example are the same as in the case of the first working example or the second working example. This being the case, in the third working example, the same components as those in the first or second working example are marked with the same numerals and symbols, and their explanations are omitted. Further, in FIG. 5, the same components as those in FIG. 3, e.g., the reproducing unit 52, the relay unit 54, the cache 55, the cache deleting unit 56, the relay terminal information 57, etc are omitted. The components omitted in FIG. 5 can be, however, included in the terminal in the third working example.

To start with, the topology management device 1 determines, through the relay node determining unit 11 illustrated in FIG. 2, the relay node N1 for the requester terminal U1, and transmits the relay node information back to the requester terminal U1. Next, the requester terminal U1 executes the following processes. The following processes correspond to the updating process 1 and the updating process 2 in the second working example and are therefore called an updating process 1A and an updating process 2A respectively in the third working example. The updating process 1A and the updating process 2A are executed by the terminal cache control unit 58 in FIG. 5. The CPU, serving as the terminal cache control unit 58, of the terminal executes programs developed on the storage device. The terminal cache control unit 58 corresponds to a terminal control unit.

In the updating process 1A, the requester terminal U1 measures the band of the link between the requester terminal U1 and the host router connected to the requester terminal U1 itself and, if there is the sufficient band, sets ON the cache duty. While on the other hand, the requester terminal U1, if the link between the requester terminal U1 and the host router connected to the requester terminal U1 itself has no sufficient band, sets OFF the cache duty.

In the updating process 2A, the requester terminal U1 determines the confluent point by searching for the connection trees extending respectively from the requester terminal U1 and the relay node N1 toward the video distribution server 2. The requester terminal U1 may, however, request the relay node N1 to search for the connection tree extending from the relay node N1 to the video distribution server 2.

Next, the requester terminal U1 makes measurements of bottleneck links up to the video distribution server 2 respectively from the requester terminal U1 and the relay node N1, thereby obtaining links serving as the bottlenecks and bands thereof. The requester terminal U1 may, however, request the relay node N1 to conduct the measurements of bottleneck links up to the video distribution server 2 from the relay node N1. Then, if both of following conditions (1) and (2) are satisfied, the requester terminal U1 sets ON the cache duty of the relay node N1.
(1) With respect to the two measured bottleneck links and the confluent point, any one of these bottleneck links is in a lower position (lower steam side) than the confluent point.
(2) The bottleneck link, which is in the lower position (lower steam side) than the confluent point does not have the sufficient band.

On the other hand, if any one of the conditions (1) and (2) is not satisfied, the requester terminal U1 sets OFF the cache duty of the relay node N1. Namely, if both of the two measured bottleneck links are in higher positions (upper steam side) than the confluent point or if the bottleneck link in the lower position than the confluent point has the sufficient band, the requester terminal U1 sets OFF the cache duty of the relay node N1.

Herein, definitions of the "the lower position (lower steam side)" and "the higher position (upper steam side)" are the same as in the second working example. To be specific, as viewed from the confluent point, if the bottleneck link exists on the side of the video distribution server 2, the definition is that the bottleneck link exists on the upper steam side. Further, as viewed from the confluent point, if the bottleneck link exists in the direction opposite to the side of the video distribution server 2, i.e., exists on the side of the requester terminal U1, the definition is that the bottleneck link exists on the lower steam side.

In the systems of the first working example and the second working example, the topology management device 1 manages the connection tree and the free band information, and hence a management function and a management cost are concentrated on the topology management device 1 as the case may be. On the other hand, in the third working example, the terminal obtains the connection tree and the free band information, and controls the cache of the self-terminal or the relay node N1. Accordingly, the information system in the third working example makes it possible to reduce the concentrated management cost of the topology (connection tree) information and the concentrated management cost of the free band information, which occur in the case of controlling the caches in a function-concentrated system using the topology management device 1. Further, a load of the communications for giving the instructions to between the terminals from the topology management device 1 is also reduced.

Fourth Working Example

Figure 6:
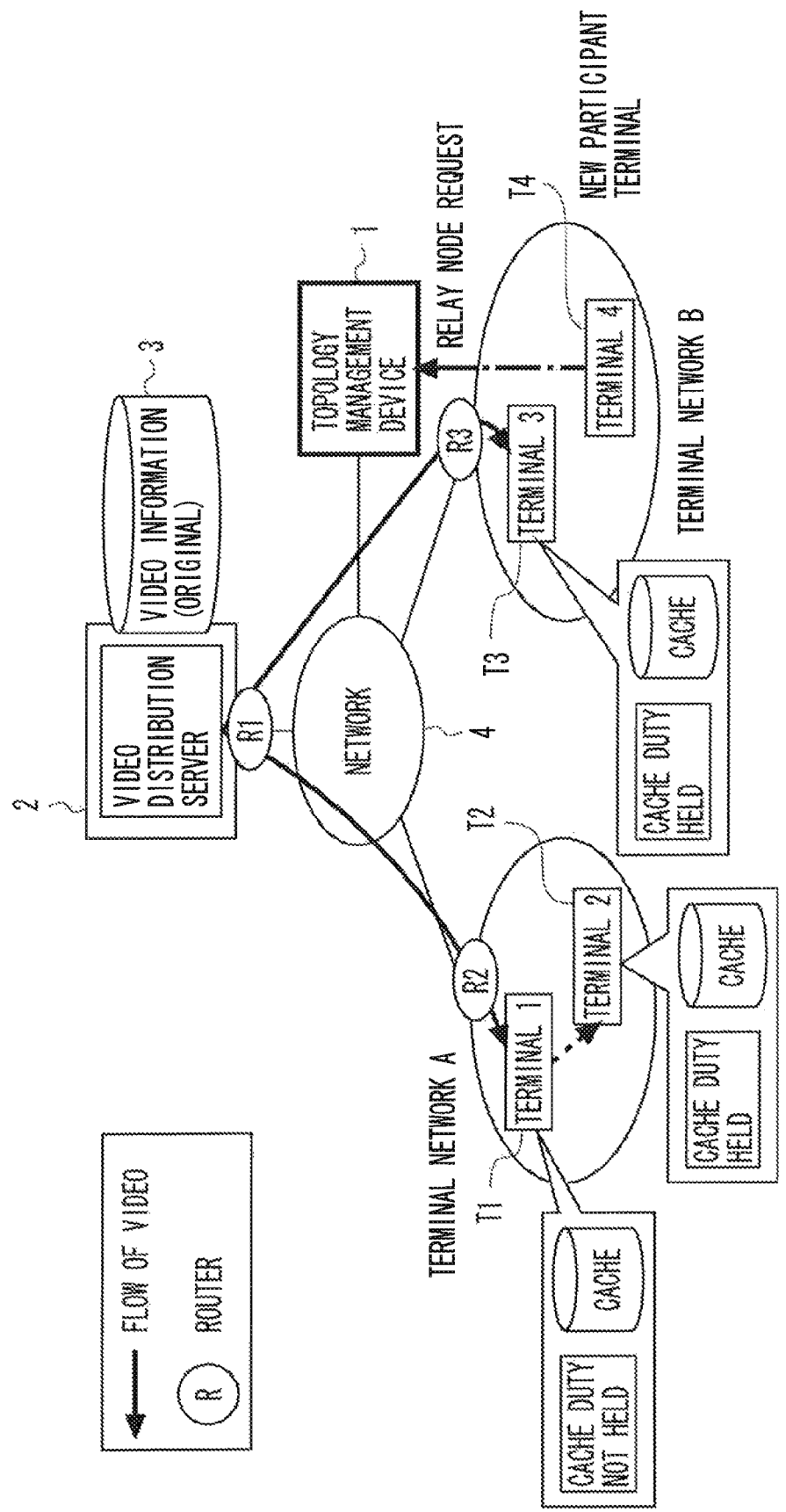
FIG. 6 is a diagram illustrating a system architecture of the information system.

The information system in a fourth working example will be described with reference to FIGS. 6 through 18. The fourth working example will exemplify a specific process in which the topology management device 1 updates the cache duty information 16. In the fourth working example also, the same components as those in the first through third working examples are marked with the same numerals and symbols, and their explanations are omitted.
<Architecture>
FIG. 6 illustrates a system architecture of the information system in the fourth working example. In FIG. 6, e.g., in the terminal network B, the terminal T3 retains, in the cache, the video received from the video distribution server 2 and holds a cache retaining duty. Then, the terminal T4 as the new participant terminal requests the topology management device 1 to determine the video distributor. Moreover, in the terminal network A, the terminal T2, to which the video is relay-distributed from the terminal T1, retains the video in the cache and holds the cache retaining duty.

Figure 7:
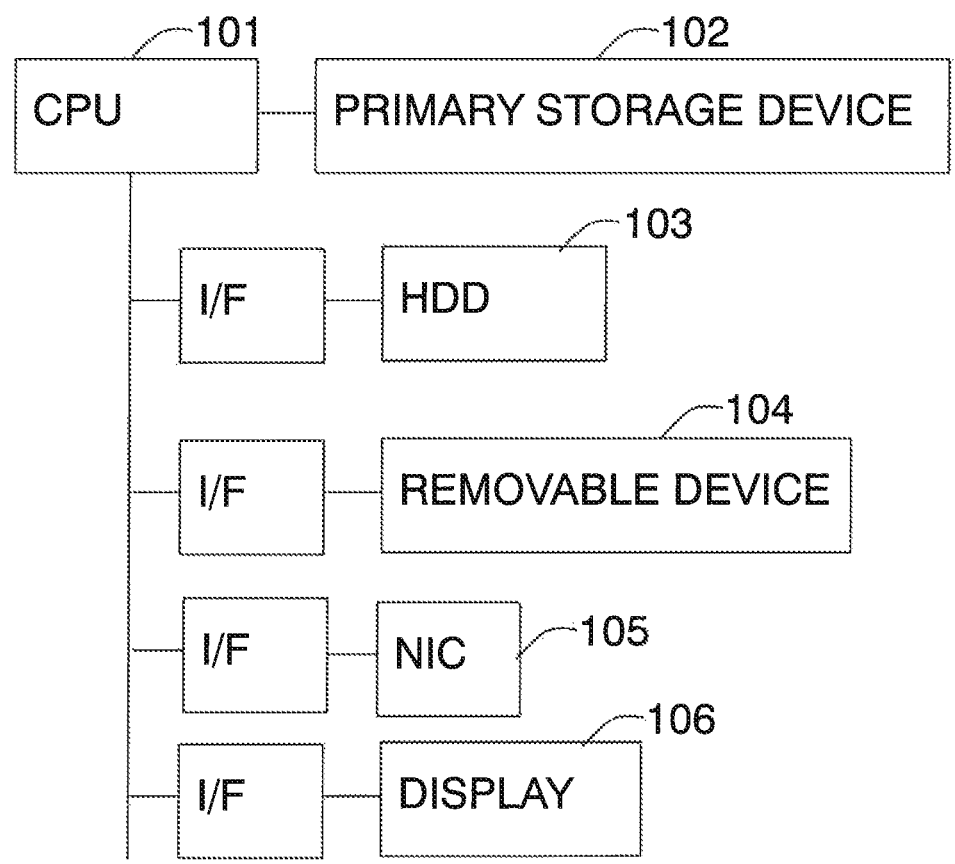
FIG. 7 is a diagram illustrating a hardware configuration of the terminal.

FIG. 7 illustrates a hardware configuration of the terminal. The terminal is exemplified by a personal computer, a PDA (Personal Digital Assistant), a mobile phone, a Personal Handyphone System (PHS), a portable game machine and an on-vehicle device. As in FIG. 7, the terminal includes a CPU 101, a primary storage device 102, a hard disc drive 103 as an external storage device, an attachable/detachable storage medium 104, a NIC 105 and a display 106. Note that the hard disc drive 103, the attachable/detachable storage medium 104, the NIC 105 and the display 106 are connected to the CPU 101 via interfaces. The interfaces are exemplified by, an Advanced Technology Attachment (ATA), a fibre channel, a Universal Serial Bus (USB) and an Internet Small Computer System Interface (iSCSI).

The CPU 101 executes the programs developed in the executable manner on the primary storage device 102, thereby providing the functions of the terminal. The primary storage device 102 retains processing target data, e.g., the received video or the programs executed by the CPU 101. Further, the primary storage device 102 includes the cache 55 illustrated in FIG. 3. Moreover, the primary storage device 102 is stored with the management information such as the terminal cache duty information 56 and the relay terminal information 57 illustrated in FIG. 3.

The hard disc drive 103 saves the programs, the information, etc stored in the primary storage device 102. For example, the hard disc drive 103 may be configured to include the cache 55 and the management information such as the terminal cache duty information 56 and relay terminal information 57. The attachable/detachable storage medium 104 is used when taking the programs and other categories of information into the hard disc drive 103. The attachable/detachable storage medium is exemplified by a Digital Versatile Disk (DVD), a Compact Disc (CD), a flash memory card, etc.

The NIC 105 is used when the CPU 101 performs the communications with other terminals, the topology management device 1, the video distribution server 2, etc. It is noted, though the illustration is omitted in FIG. 7, the CPU 101 may be connected to a wireless communication device via an interface. For instance, in place of the NIC 105 in FIG. 7, a base station access device for the mobile phone, a connection device with an on-road communication device or a wireless Local Area Network (LAN) card may be provided. Then, the CPU 101 may perform the communications with the base station for the mobile phone, the on-road communication device or other wireless terminals. The display 106 is used when displaying the video or the information processed by the CPU 101 on the screen.

Data Example

Figure 8:
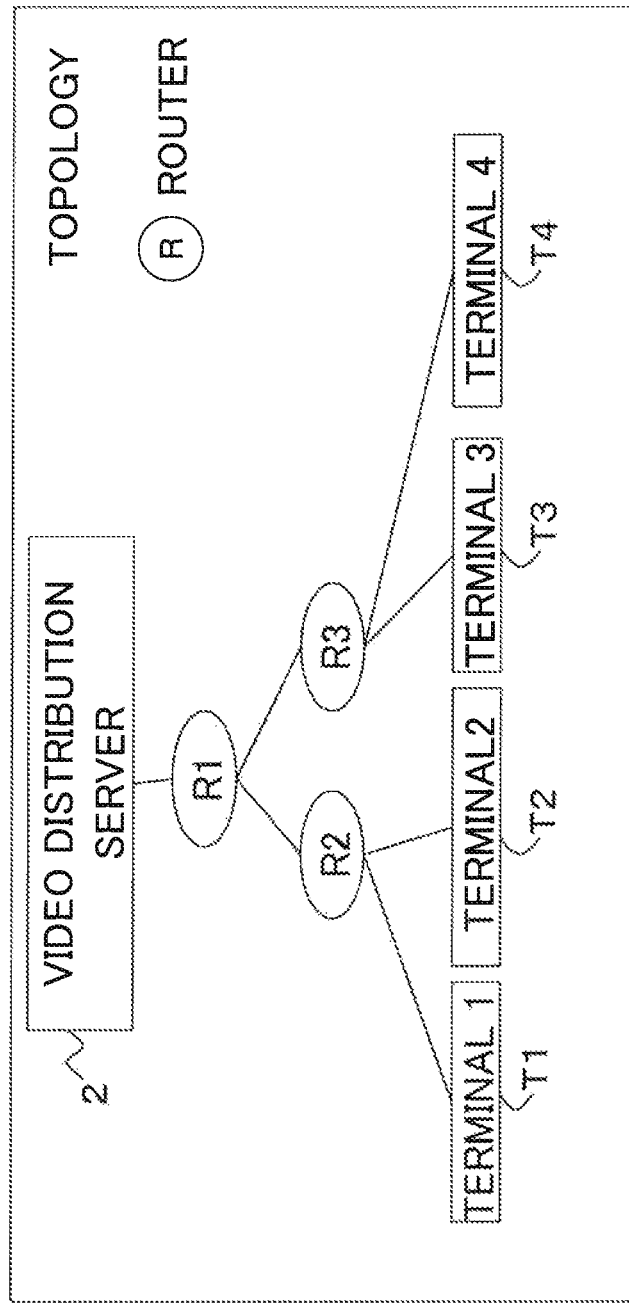
FIG. 8 is a diagram illustrating the connection tree.

A data example will hereinafter be described by taking the information system including the network 4 in FIG. 6 for example. FIG. 8 illustrates the connection tree. The connection tree represents the topology of the network 4 in FIG. 6. In the example of FIG. 8, a router R1 is connected under the video distribution server 2, and the route branches off under the router R1. Then, a router R2 and a router R3 are connected under the router R1. Moreover, the terminals T1 and T2 are connected to the router R2. Further, the terminals T3, T4 are connected to the router R3.

FIG. 9 illustrates information of a content number 3 in the cache duty information 16 held by the topology management device 1. The cache duty information 16 in the topology management device 1 contains information on the video other than the content number 3 as the case may be. In FIG. 9, the cache duty information 16 is expressed in the table format, and each row of the Table corresponds to one record of the cache duty information 16. Each record of the cache duty information 16 has respective elements such as a terminal number, a content number and a cache duty. The element is also called a field.

The terminal number is information for identifying the terminal. Further, the content number is information for identifying the content. In one record of the cache duty information 16, the terminal and the video are specified by the terminal number and the content number. Then, the "cache duty" field in FIG. 9 defines whether or not the relevant terminal holds the cache duty of the relevant content. Note that each terminal has the cache duty information 16 about the self-terminal.

FIG. 10 illustrates the free band information. The free band information is contained in the topology and free band information 15 in FIG. 3. Each record of the free band information in FIG. 10 contains a link ID and a free band. In the free band information of FIG. 10, the "link ID" field specifies a link, i.e., a transmission path which connects any two devices among the video distribution server 2, the router and the terminal. In the example of FIG. 10, the link ID is specified by identifiers of the devices located at both ends of the link. For example, "Distribution Server, R1" specifies a transmission path (link) between the video distribution server 2 and the router R1. A value in the "free band" field is specified by the unit such as Mbit/sec. In the following discussion, however, the free band is expressed in value having no unit.

FIG. 11 illustrates access information. The access information is information in which a terminal number and an IP address of the individual terminal are associated with each other. To be specific, each record of the access information retains elements such as the terminal number and the IP address of the terminal corresponding to the terminal number.

FIG. 12 illustrates the terminal cache duty information 56 depicted in FIG. 3. The terminal cache duty information 56 retains information indicating whether each terminal holds the cache duty of each content or not. Accordingly, the terminal cache duty information 56 corresponds to information about one terminal in the cache duty information 16 of FIG. 9. As in FIG. 12, each record of the terminal cache duty information 56 contains elements such as a content number and a cache duty.

FIG. 13 illustrates the relay terminal information 57 depicted in FIG. 3. The relay terminal information 57 is information for defining a relation between the relay destination terminal to which the relay node N1 now relays the video (content) and the relay target video. As in FIG. 13, each record of the relay terminal information 57 contains elements such as a terminal number and a content number. Herein, the terminal number is information for specifying the requester terminal U1 defined as the video requester. Further, the content number is information for specifying the video content that is distributed to the requester terminal U1. Accordingly, the relay terminal information 57 is stored with the information specifying which video is now distributed to the requester terminal U1.

Figure 14:
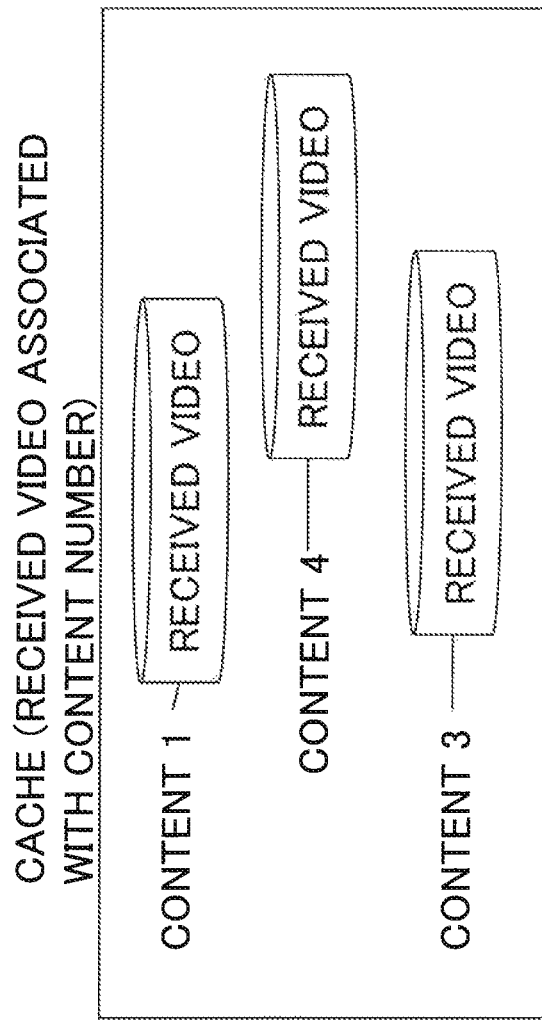
FIG. 14 is a diagram illustrating an example of a data structure of a cache.

FIG. 14 illustrates an example of a data structure of the cache. The cache can be identified by the content number and retains the video linked by the content number. For example, the cache includes the management information containing a pair of content number and video storage address and further includes a received video retained in the storage address. The management information and the video are retained in, e.g., the primary storage device 102 or the external storage device such as the hard disk. Accordingly, the terminal may simply acquire the received video by searching for an entry of the management information by use of the content number to thereby acquire the storage address in the primary storage device 102.

Processing Example

Figure 15:
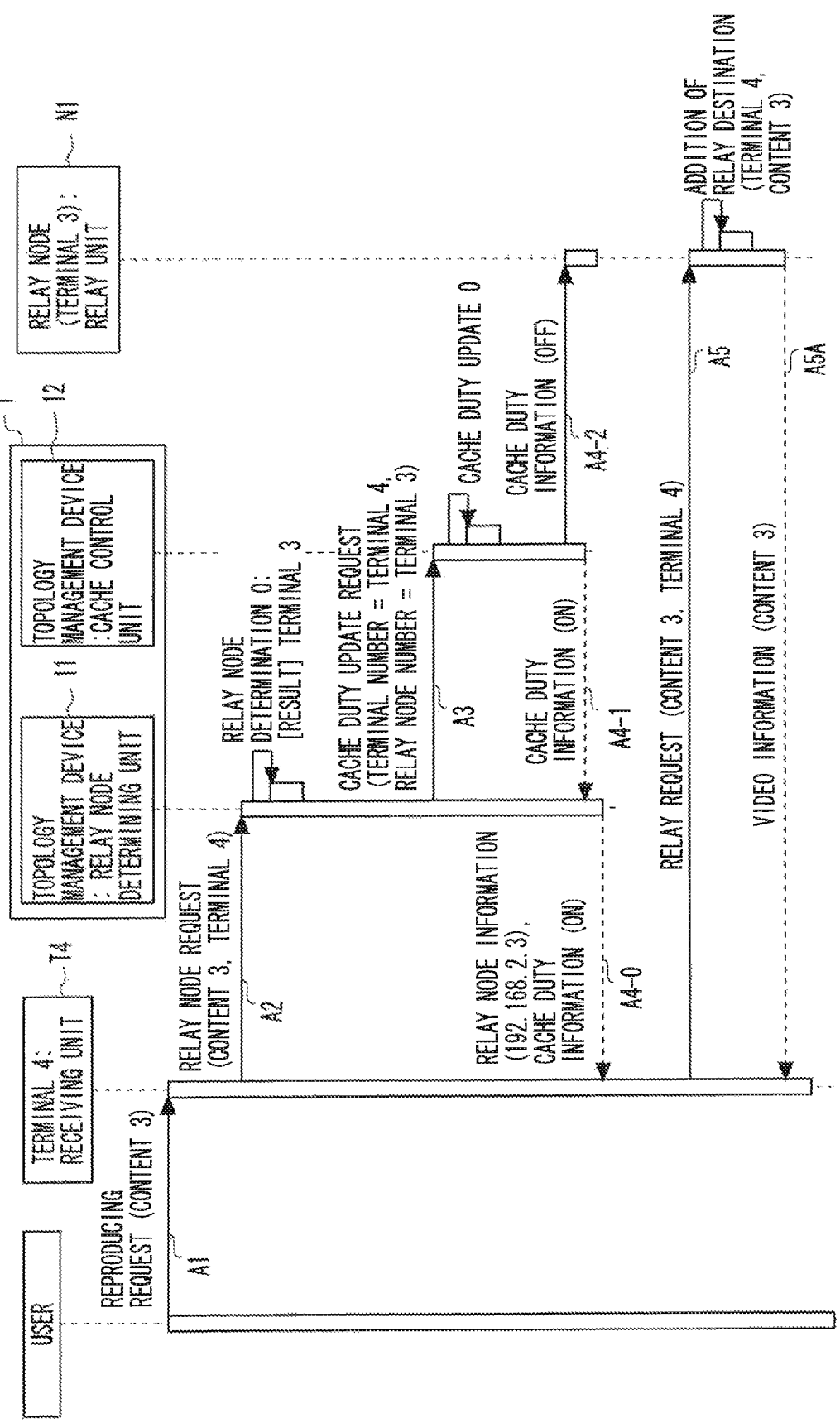
FIG. 15 is a diagram illustrating a processing procedure starting with the terminal's receiving a reproducing request from a user and ending with issuing a relay request to a relay node.

FIG. 15 illustrates a processing procedure starting with the terminal's receiving a reproducing request from the user and ending with issuing a relay request to the relay node N1.

To begin with, the terminal T4 receives the reproducing request from the user (an arrowhead A1). The reproducing request includes the content number. The video specified by the content number corresponds to request target information.

When receiving the reproducing request from the user, the terminal T4 sends the relay node request to the topology management device 1 (an arrowhead A2). The relay node request contains the content number for specifying the relay target video and the terminal number of the requester terminal T4. Upon receiving the relay node request from the terminal T4, the relay node determining unit 11 of the topology management device 1 executes a relay node determining process.

Figure 16:
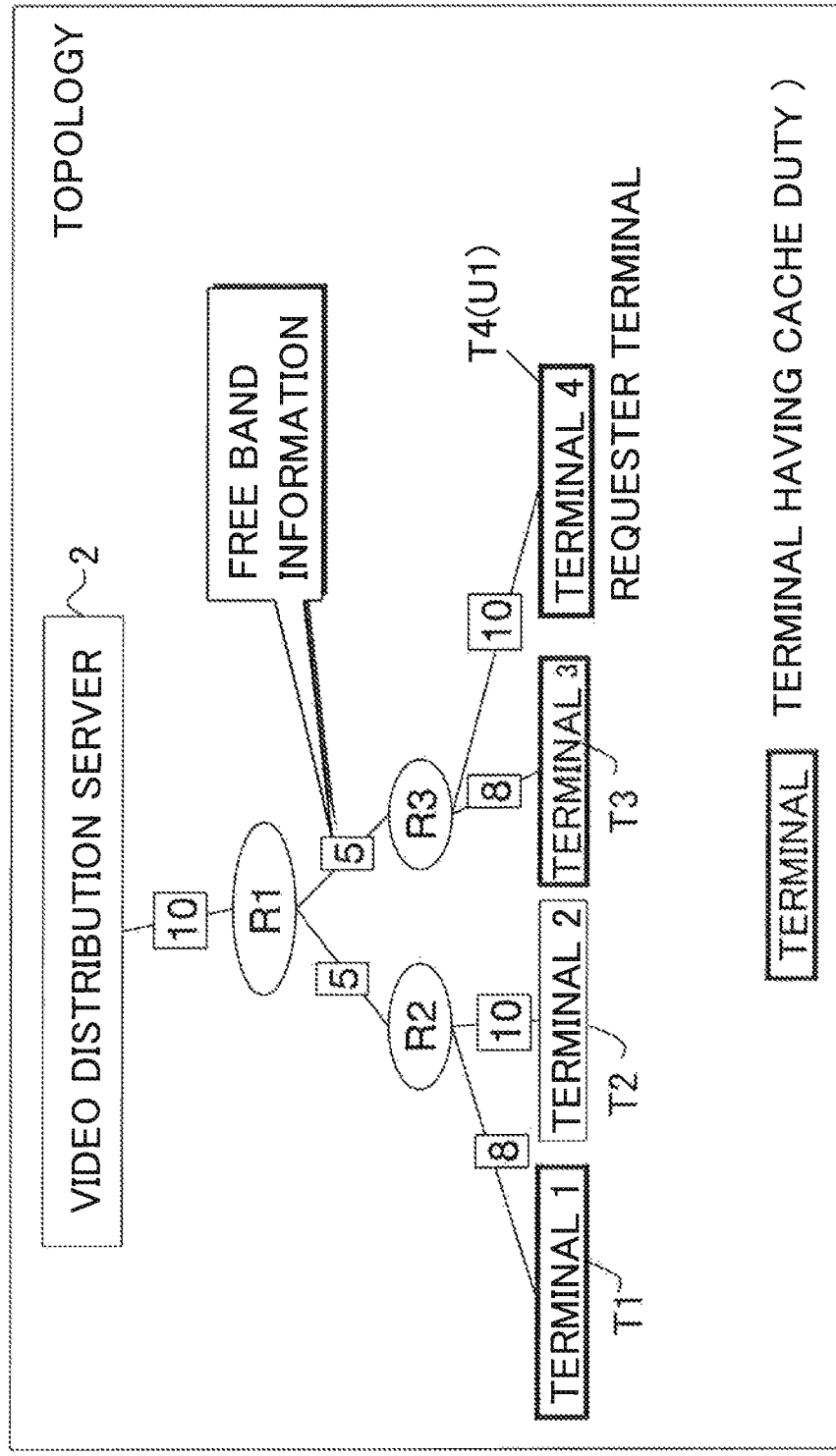
FIG. 16 is a diagram illustrating a processing example of a relay node determining unit.
Figure 17:
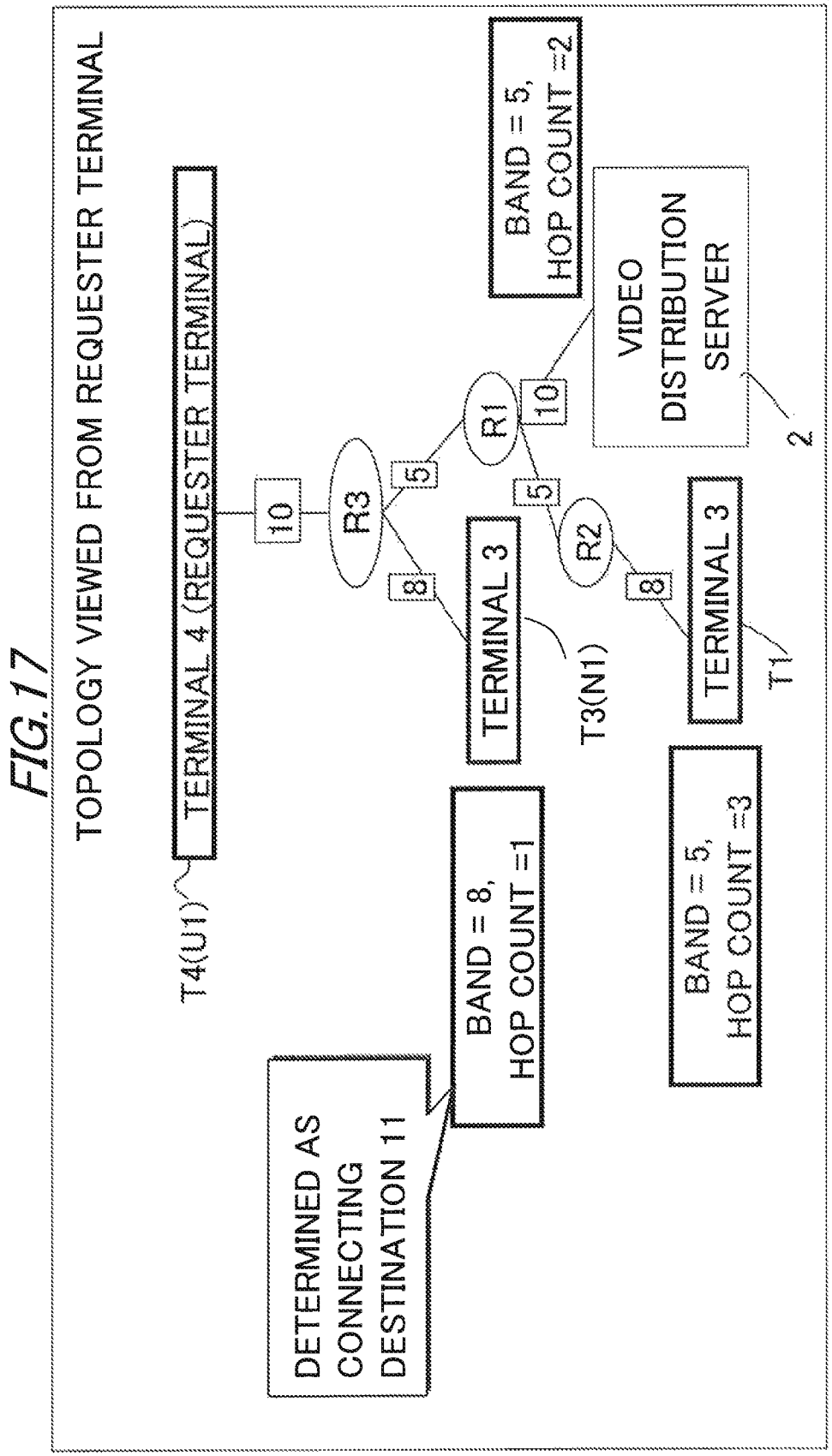
FIG. 17 is a diagram illustrating a processing example of the relay node determining unit.

FIGS. 16 and 17 illustrate processing examples of the relay node determining unit 11 of the topology management device 1. Now, it is assumed that a status of the network 4 including the topology, the cache duty and the free band information is as illustrated in FIGS. 16 and 17. The topology and free band information illustrated in FIG. 16 is acquired and managed by the network information collecting unit 13 depicted in FIG. 2. The network information collecting unit 13 collects the topology and free band information from the network 4 by executing, e.g., the SNMP.

As illustrated in FIG. 16, the router R1 is connected to the video distribution server 2. The link free band between the video distribution server 2 and the router R1 is 10. The assumption in the fourth working example is that the band is expressed by the value having no unit. Further, the routers R2 and R3 are connected via two links to the router R1. Both of the link free band between the routers R1 and R2 and the link free band between the routers R1 and R3 are 5. Moreover, the terminal T1 is connected to the router R2 via the link having the link free band "8". Further, the terminal T2 is connected to the router R2 via the link having the link free band "10". Still further, the terminal T3 is connected to the router R3 via the link having the link free band "8". Yet further, the terminal T4 is connected to the router R3 via the link having the link free band "10". In the topology of FIG. 16, the terminal T4 is the video requester terminal U1. Moreover, in FIG. 16, it is assumed that the video having the content number which is requested by the terminal T4 is retained in the terminals T1 and T3. The terminal T1 and the terminal T3 are called relay node candidates.

As illustrated in FIG. 17, the relay node determining unit 11 obtains, as viewed from the requester terminal T4, an intra-route link free band and a hop count up to the relay node candidate. The relay node candidate includes the terminal holding the cache duty and the video distribution server 2.

In the process of the relay node determining unit 11, the intra-route link free band is defined as a minimum value of the respective link free bands between the terminals and the individual relay node candidates. Further, the hop count is defined as the number of the routers between the terminals (the routers located on the route). The relay node determining unit 11 selects the terminal T3 as the relay node from within the relay node candidates by the following standards (1)-(3). FIG. 17 illustrates a result of the selection by the relay node determining unit 11.

(Standard 1) The relay node determining unit 11 detects the minimum link free band as the intra-route link free band on the route extending from the requester to the relay node candidate. Then, the relay node determining unit 11 selects the relay node candidate with the maximum intra-route link free band as the connection destination.

(Standard 2) If there is the plurality of relay node candidates having the maximum intra-route link free band, the relay node determining unit 11 selects the relay node candidate having the minimum hop count calculated from the requester from within the plurality of candidates with the maximum intra-route link free band.

(Standard 3) If there is the plurality of relay node candidates having the maximum intra-route link free band and the minimum hop count calculated from the requester, the relay node determining unit 11 randomly selects one of the plurality of candidates having the maximum intra-route link free band and the minimum hop count, and determines the selected relay node candidate as the connection destination.

FIG. 17 illustrates a processing result with respect to the example of the topology and free band information in FIG. 16. Namely, the terminal T3 is determined as the relay node N1 for the terminal T4 defined as the requester terminal U1. As viewed from the terminal T4, the link up to the terminal T3 defined as the relay node candidate has the intra-route link free band "8" and the hop count "1". On the other hand, as viewed from the terminal T4, the link up to the terminal T1 defined as another relay node candidate has the intra-route link free band "5" and the hop count "3". Further, as viewed from the terminal T4, the link up to the video distribution server 2 has the intra-route link free band "5" and the hop count "2". Then, the relay node determining unit 11 determines the terminal T3 as the relay node N1 by the (Standard 1).

After determining the relay node, the relay node determining unit 11 transmits a cache duty update request to the cache control unit 12 (an arrowhead A3 in FIG. 15). The cache duty update request contains a terminal number of the video requester and a relay node number. The relay node number may be defined as the terminal number when the relay node N1 is the terminal and to a previously allocated special number in the case of the video distribution server 2.

When receiving the cache duty update request from the relay node determining unit 11, the cache control unit 12 executes the cache duty updating process. In the cache duty updating process, the cache control unit 12 updates the cache duty information illustrated in FIG. 12. Further, each terminal is notified of whether the cache duty is held or not according to the following procedure. To be specific, the cache control unit 12 notifies the relay node N1 that the cache duty of the video specified by the request target content number be set OFF (an arrowhead A4-2). Furthermore, the cache control unit 12 notifies the relay node determining unit 11 that the cache duty of the terminal T4 be set ON (an arrowhead A4-1).

The relay node determining unit 11 notifies the terminal T4 of the information on the relay node N1 and also instructs the terminal T4 to set ON the cache duty (an arrowhead A4-0).

The terminal T4 receives the relay node information and the designation (ON/OFF) of the cache duty from the topology management device 1. Moreover, the terminal T4 writes "ON" to the terminal cache duty information 56 with respect to the video having the requested content number. The relay node information is information required for accessing the relay node on the network and is, e.g., the IP address if on the Internet Protocol (IP) network.

The terminal T4 accesses the relay node N1 by making use of the relay node information and sends the relay request (an arrowhead A5). The relay request contains the content number and the terminal number of the requester terminal T4.

The relay unit 54 of the relay node N1, upon receiving the relay request, executes a relay destination adding process. Namely, the relay unit 54 adds a tuple of the relay destination terminal number and the content number to the relay terminal information 57. Further, the relay unit 54 reads the video having the content number contained in the relay request from the cache area, and distributes the video to the relay destination terminal 4 (an arrowhead A5A)

The terminal T4 receives the video from the relay node N1 and writes the video to the cache while reproducing the received video by a reproducing device. The reproducing device includes, e.g., a decoder which decodes the received video, a DA (Digital-to-Analog) converter, a graphic board, an amplifier, etc. The reproduced video is output from the display 106 and an unillustrated loudspeaker. The video information, which is so stored as to be identifiable by the content number, is written to the cache.

Figure 18:
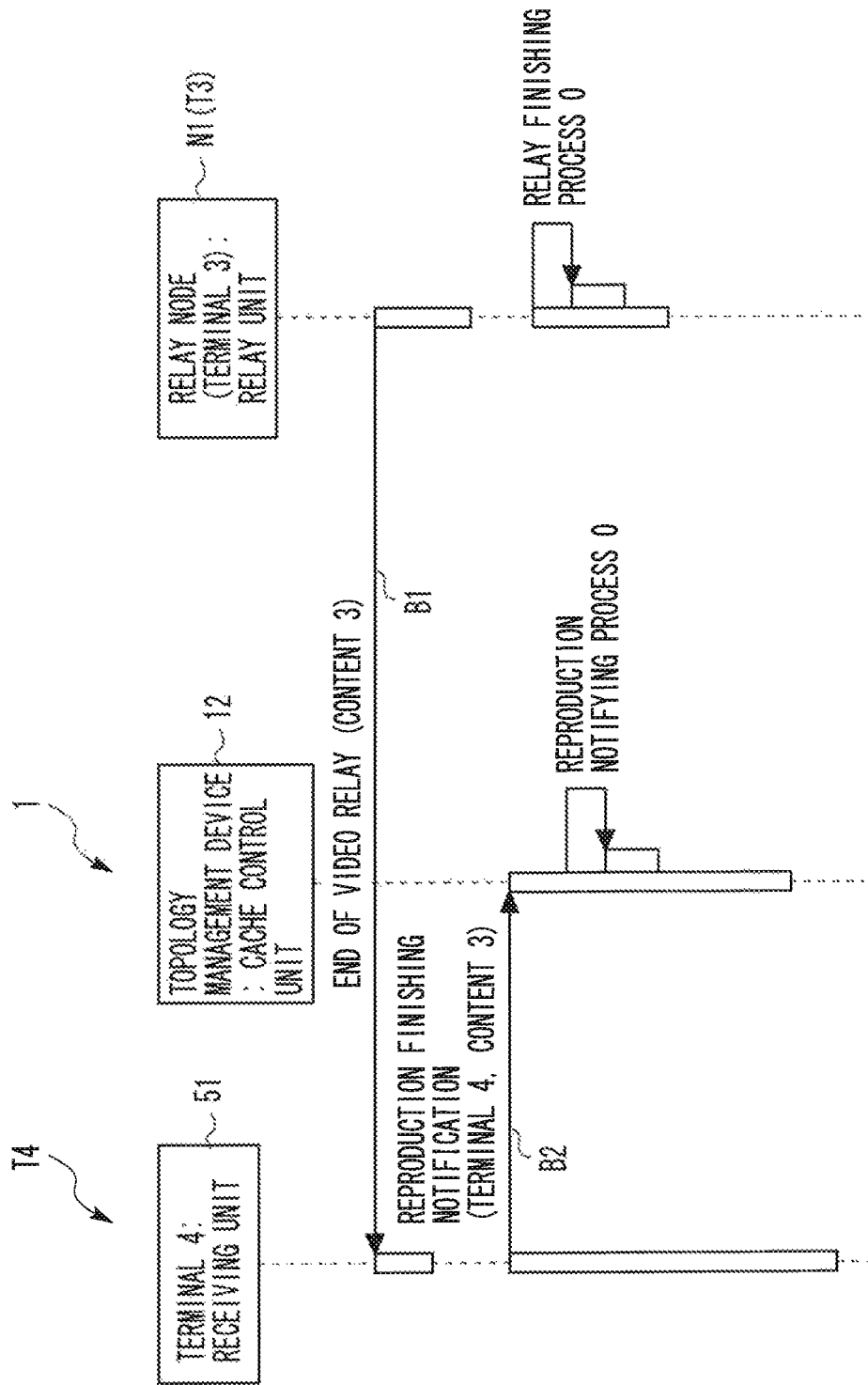
FIG. 18 is a diagram illustrating an operation flow when finishing the reproduction.

FIG. 18 illustrates an operation flow when finishing the reproduction. FIG. 18 illustrates an example in a case where the terminal T4 finishes reproducing the video having the content number 3. The video is relay-distributed to the terminal T4 from, e.g., the relay node N1. As explained in FIG. 15, the relay-distributed video is written to the cache of the terminal T4. The relay node N1, when finishing relaying the requested video, notifies the terminal T4 of the end of the relay (an arrowhead B1). After the end of the relay, the relay node N1 deletes, from the relay terminal information 57, an entry in the content number of the content with its transmission being finished and an entry in the relay destination terminal number. Note that the relay node N1 deletes, upon, e.g., the timer-based startup, the video with its relay being finished and with the cache duty being set OFF from the cache.

On the other hand, the terminal T4 continues to reproduce the video even after finishing the relay-distribution of the video. Then, the receiving unit 51 of the terminal T4, when reproducing the video received from the relay node N1 to the end, transmits end-of-reproduction notification to the cache control unit 12 of the topology management device 1 (an arrowhead B2). The end-of-reproduction notification contains the terminal number of the self-terminal and the content number of the content with its reproduction being finished. Further, the terminal T4 sets OFF the terminal cache duty information 56 of the self-device. It is noted, with the end of the reproduction, the terminal T4 may wait till the predetermined period of time elapses after finishing the reproduction in place of setting OFF the cache duty of the video of which the reproduction has been terminated. Then, the predetermined period of time elapses after the end of the reproduction, and the request for the relay-distribution is not given from any other terminals, in which case the terminal T4 may set OFF the terminal cache duty information 56 of the self-device. The terminal T4, in the case of setting OFF the cache duty after the elapse of the predetermined period of time subsequently to the end of the reproduction, may simply notify the topology management device 1 that the cache duty has been set OFF.

When receiving the end-of-reproduction notification from the terminal T4, the cache control unit 12 of the topology management device 1 sets OFF the cache duty in the record specified by the terminal number and the content number in the cache duty information 16, which are related to the reception of the end-of-reproduction notification. As a substitute for the end-of-reproduction notification, the cache control unit 12 of the topology management device 1 may, when receiving the notification indicating that the cache duty has been set OFF after the elapse of the predetermined period of time subsequently to the end of the reproduction, set OFF the cache duty related to the content number received with the notification.

Then, the terminal T4 finishing the reproduction periodically deletes the video in the cache 55. For instance, the cache deleting unit 53 illustrated in FIG. 3 may also be invoked periodically by the timer. Then, the cache deleting unit 53 invoked by the timer searches for the content number, which satisfies the following conditions, from within the respective content numbers existing in the cache 55.
(1) The cache duty is set OFF in the terminal cache duty information 56.
(2) Any entries do no exist in the relay terminal information 57. The cache deleting unit 53 may, in the case of having detected the content number satisfying both of the conditions (1) and (2), delete the video linked to the detected content number from the cache 55.

The confirmation of the conditions (1) and (2) enables the terminal T4 to delete the cache of the video that has no cache duty and is deemed unnecessary in a way that excludes the video in the process of being relay-distributed. With the periodical timer-based startup of the cache deleting unit 53, it is feasible to easily confirm that the conditions (1) and (2) are established and to delete the unnecessary cache. The cache deleting process according to the timer-based startup of the cache deleting unit 53 which has been described so far may similarly be executed also in the relay node N1. The relay node N1 may start up the cache deleting unit 53 in the way of being triggered by finishing the relay-distribution.

As discussed so far, in the information system of the fourth working example, from the relay-distribution relation between the requester terminal U1 and the relay node N1, the topology management device 1 sets ON the cache retaining duty of the requester terminal U1 and sets OFF the cache retaining duty of the relay node N1. According to the process in the fourth working example, it is possible to relax the concentration of the video distribution load on the video distribution server 2 or one relay node N1.

Further, the relay node N1 has a less possibility of maintaining the cache long and can therefore reduce the storage capacity for maintaining the cache. Moreover, the relay node N1 has an increased possibility that the cache can be deleted when finishing the relay and can therefore save the power for distributing the video to a greater degree than in the case of maintaining the cache long.

Further, on the requester terminal U1 with the video being reproduced later than the relay node N1, i.e., on the terminal T4 in the fourth working example, the cache can be maintained long. It is therefore possible to realize the cache management which conforms to the LRU algorithm.

Moreover, the cache deleting unit 53 is started up based on the timer, thereby enabling the video cache to be easily deleted by determining the establishment of the two conditions that the cache duty of the cached video is set OFF and that the video is not in the process of being relay-distributed.

Fifth Working Example

A fifth working example will be described with reference to FIGS. 19 and 20. The fifth working example will discuss a specific processing example in which the cache control unit 12 updates the cache duty on the basis of the topology and free band information 15 of the network 4 in the process when reproduced. The system architecture in the fifth working example is the same as in the first through fourth working examples. Further, in the information system of the fifth working example, the processing sequence is the same as in FIG. 15 in the fourth working example, however, the update procedure of the cache duty information changes from the procedure in the fourth working example.

Figure 19:
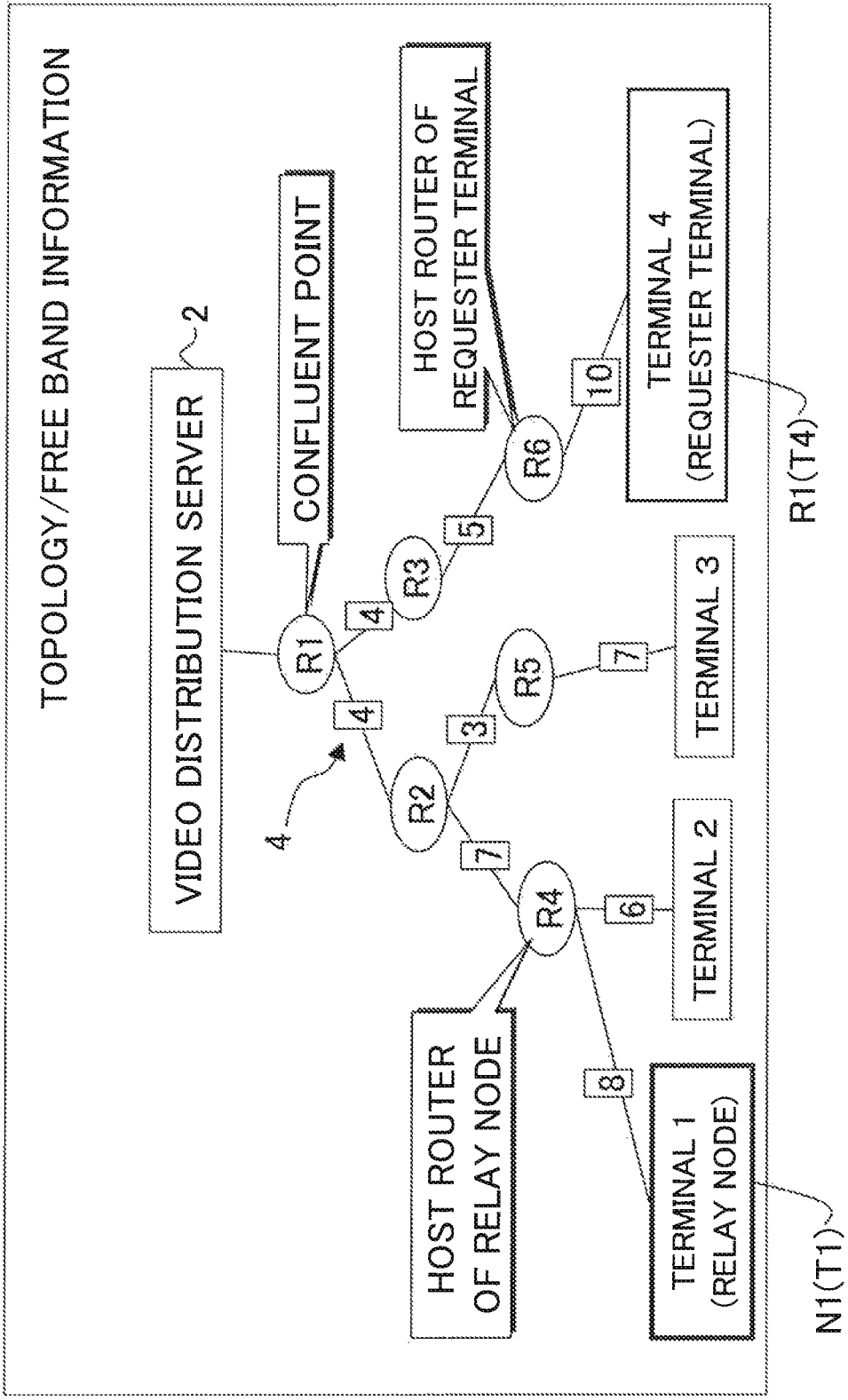
FIG. 19 is a diagram illustrating a connection tree, free band information and a status of the relay node.

An assumption in the fifth working example is that topology and free band information 15 and the status of the relay node N1 are as illustrated in FIG. 19. It is also assumed that a bit rate of the distribution target video is "2". Herein, an assumption is that the bit rate is expressed on a non-unit basis. Further, the requester terminal U1 is presumed to be, e.g., the terminal T4. Moreover, the relay node N1, which relay-distributes the video to the requester terminal U1, is presumed to be the terminal T1.

The cache control unit 12 of the topology management device 1 obtains the host router of the terminal T4 defined as the requester terminal U1 from the connection tree. In FIG. 19, the cache control unit 12 obtains the router R6 as the host router of the terminal T4. If the sufficient free band is provided between the requester terminal U1 and the host router R6, the cache control unit 12 sets ON the cache duty of the requester terminal U1. Furthermore, whereas if the sufficient free band is not provided between the requester terminal U1 and the host router R6, the cache control unit 12 sets OFF the cache duty of the requester terminal U1.

In the fifth working example, the expression that "the sufficient free band is provided between the two points" is defined such that "the band for streaming $\alpha 1$-piece(s) of video(s) is left between the two points", which satisfies the following formula.

$$\text{(Minimum Value of Free Band of Link Connecting Two Points)} \geq \text{(Bit Rate of Video)} \times \alpha 1 \quad \text{Formula (1)}$$

where it is presumed that $\alpha 1=1$.

In the example of FIG. 19, the link free band is 10, the video bit rate is 2, and $\alpha 1=1$, which satisfies the formula (1).

Accordingly, the cache duty of the terminal T4 serving as the requester terminal U1 is set ON.

Next, the cache control unit 12 determines, on the connection tree, a confluent point at which the path connecting the relay node N1 to the video distribution server 2 gets confluent with the path connecting the requester terminal U1 to the video distribution server 2. In the determination of the confluent point, the cache control unit 12 obtains a list of video distribution server 2 and routers included on each path.

FIG. 20 illustrates a path list including the video distribution server 2 and routers. Each row of the Table illustrated in FIG. 20 corresponds to a record of one path. The elements of the path list include a train of devices in the sequence toward a lower steam direction from the video distribution server 2. To be specific, the first row in FIG. 20 is a description row. The top element in the first row includes a description "element number", and the elements from the second onward represent the positions of the elements in the sequence such as 1, 2, 3 and 4.

Furthermore, the second row in FIG. 20 indicates a list of the path extending from the video distribution server 2 to the terminal T1 serving as the relay node N1. The list of the path extending to the terminal T1 includes the video distribution server 2 and the routers R1, R2 and R4. Moreover, the third row in FIG. 20 indicates the list of the path extending from the video distribution server 2 to the terminal T4 serving as the requester terminal U1. The list of the path extending to the terminal T4 includes the video distribution server 2 and the routers R1, R3 and R6.

The cache control unit 12 compares the two lists sequentially from the top element and obtains the elements that are different first in their numbers. In FIG. 20, with respect to the element number 3, the element in the list of the path extending to the terminal T1 serving as the relay node N1 is the router R2, and the element in the list of the path extending to the terminal T4 serving as the requester terminal U1 is the router R3. Then, the cache control unit 12 sets, as the confluent point, the element(s) in the element number 2 anterior by one to the element number 3. In the examples of FIGS. 19 and 20, the confluent point is the position of the router R1.

The cache control unit 12, if the sufficient free band is provided between the host router of the relay node N1 and the confluent point and further if the sufficient free band is provided between the host router of the requester terminal U1 and the confluent point, sets OFF the cache duty of the relay node N1. While on the other hand, the cache control unit 12, (1) if the sufficient free band is not provided between the host router of the relay node N1 and the confluent point or (2) if the sufficient free band is not provided between the host router of the requester terminal U1 and the confluent point, sets ON the cache duty of the relay node N1. Namely, in the case of satisfying at least one of the conditions (1) and (2), the cache control unit 12 sets ON the cache duty of the relay node N1. The expression of "the sufficient free band is provided between the two points" satisfies, it is assumed, the following formula (2).

(Minimum Value of Free Band of Link on Path Connecting Two Points)≥(Bit Rate of Video)×α2　　　Formula (2)

where it is presumed that α2=3.

In the example of FIG. 19, the minimum value of the link free band on the route connecting the relay node N1 to the confluent point R1 is 4, the video bit rate is 2, and α2=3, which does not satisfy the formula (2). Therefore, the cache control unit 12 sets ON the cache duty of the relay node N1.

As discussed above, according to the information system in the fifth working example, the cache duty can be updated based on the connection tree of the network 4 and the free band information. Unless the sufficient free band is provided between the requester terminal U1 and the host router, the requester terminal U1, even when keeping the video as the cache after receiving the video, has a high possibility that the requester terminal U1 can not efficiently distribute the video kept as the cache. Accordingly, in this case, the cache capacity and the load on the distributing process on the requester terminal U1 can be reduced by deleting the cache of the requester terminal U1.

Moreover, for instance, as in the example of FIG. 19, the cache control unit 12 keeps ON the cache duty of the relay node N1 if the sufficient free band is provided neither between the host router of the relay node N1 and the confluent point nor between the host router of the requester terminal U1 and the confluent point, thereby allowing a rise in cache capacity and giving the priority to maintaining and improving the video distribution performance by the relay-distribution function of the relay node N1.

On the other hand, whereas if the sufficient free band is provided between the host router of the relay node N1 and the confluent point and between the host router of the requester terminal U1 and the confluent point, the video distribution server 2 may smoothly execute distributing the video. Accordingly, the cache capacity can be reduced by deleting the cache of the relay node N1. Further, the load on executing the relay-distribution of the relay node N1 is decreased. As described above, according to the information system in the fifth working example, the determination as to whether the cache on the terminal for the relay-distribution is required or not, is properly made based on the connection tree of the network 4 and the free band information.

Sixth Working Example

A sixth working example will be described with reference to FIG. 21. In the sixth working example, the cache duty is updated based on topology information of the network and the free band information. Other configurations and operations in the sixth working example are the same as in the case of the forth and fifth working examples. This being the case, in the sixth working example, the same components as those in the fourth and fifth working examples are marked with the same numerals and symbols, and their explanations are omitted. Further, the reference to the drawings in the first through fifth working examples are made as the necessity may arise.

Figure 21:
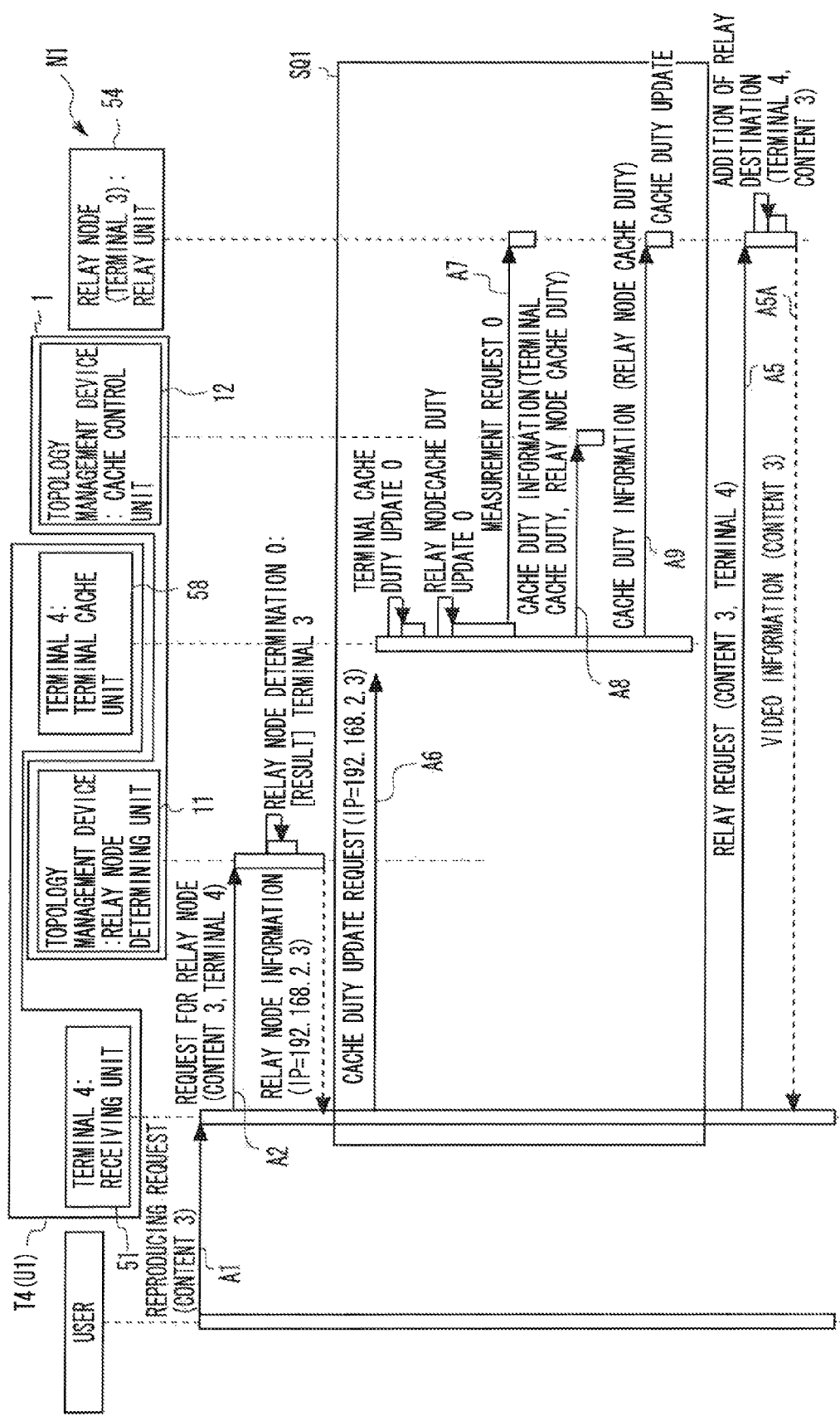
FIG. 21 is a diagram illustrating (part 1) illustrating a processing procedure in which the terminal updates the cache duty.

FIG. 21 illustrates a processing procedure in which the terminal updates the cache duty. In FIG. 21, processes in an area circumscribed by a rectangular frame SQ1 are different from those in the fourth working example. In the sixth working example also, similarly to FIG. 15 in the fourth working example, the topology management device 1 executes the relay node determining process. After determining the relay node, the topology management device 1 sends, as the relay node information, the node number of the terminal determined to be the relay node N1 or the address on the network 4 back to the terminal T4 serving as the requester terminal U1. In FIG. 21, the IP address is exemplified as the address on the network 4.

Next, the receiving unit 51 of the terminal T4 transmits, before giving the relay request (an arrowhead A5) to the relay node N1, a cache duty update request to the terminal cache control unit 58 (an arrowhead A6). The cache duty update request contains the relay node information, e.g., the terminal number of the relay node N1 or the address of the relay node N1 on the network 4.

Upon receiving the cache duty update request, the terminal cache control unit 58 executes updating the cache duty of the self-terminal and updating the cache duty of the relay node N1. In the update of the cache duty of the self-terminal, the terminal cache control unit 58 measures the band (of the path) up to the host router to which the terminal T4 is connected and, if the sufficient free band is provided, sets ON the cache duty of the self-terminal. Further, the terminal cache control unit 58, whereas if the sufficient free band is not provided on the path extending to the router to which the terminal T4 is connected, sets OFF the cache duty of the self-terminal. The band measurement by the terminal T4 can involve using the existing software such as pathchar (ftp://ftp.ee.ibl.gov/pathchar/) and pchar (http://www.kitchenlab.org/www/bmah/Software/pchar/). The resultantly obtained information is the same as the free band information in FIG. 10.

Moreover, in the update of the cache duty of the relay node N1, the terminal cache control unit 58 searches for the relay routers in the direction from the terminal T4 to the video distribution server 2, and thus acquires the list of the path connecting with the terminal T4 in the path lists similar to those in FIG. 20. For searching for the relay routers, the terminal cache control unit 58 can utilize the existing software such as traceroute (http://ja.wikipedia.org/wiki/Traceroute).

Further, the terminal cache control unit 58 makes the bottleneck link measurement on the route from the terminal T4 to the video distribution server 2, thus obtaining the link number of the link serving as the bottleneck link and the band of this link. The terminal cache control unit 58 utilizes the software such as pathchar and pchar for obtaining the bottleneck link number and the band thereof. In the sixth working example, the route extending from the terminal T4 to the video distribution server 2 corresponds to a first server route.

For instance, with respect to the network 4 in FIG. 19, there are resultantly obtained the band minimum value "4" on the route between the terminal T4 and the video distribution server 2 and the link R1-R3 (having this value). The link R1-R3 is a transmission path which connects the router R1 to the router R3.

The terminal cache control unit 58 requests the relay node N1 to search for the relay routers and to measure the bottleneck link (an arrowhead A7). Then, the relay node N1 conducts the measurements of the bottleneck links on the route from the relay node N1 to the video distribution server 2, thereby acquiring the link number of the link becoming the bottleneck link and the band thereof. Subsequently, the relay node N1 reports a result of the measurement to the terminal T4. As a consequence of this, the terminal cache control unit 58 obtains the path lists on the side of the relay node N1 from within the path lists of FIG. 20, and obtains the bottleneck link number of the link on the route extending from the relay node N1 to the video distribution server 2 and the band thereof. In the sixth working example, the route from the relay node N1 to the video distribution server 2 corresponds to a second server route.

The terminal cache control unit 58 acquires, in the same procedure as in the second, third and fifth working examples, the confluent point between the route extending from the terminal T4 to the video distribution server 2 and the route from the relay node N1 to the video distribution server 2. Moreover, the terminal cache control unit 58, if at least one of the two bottleneck links is in the lower position than the confluent point and if the band of this link is not sufficient, sets ON the cache duty of the relay node N1. Further, the terminal cache control unit 58, if both of the two bottleneck links are in the upper stream positions than the confluent point or if the bottleneck link in the lower position than the confluent point has the sufficient band, sets OFF the cache duty of the relay node N1. Herein, the phase "having the sufficient band" connotes that the free band can sufficiently ensure the bit rate of the video distribution, and, to be specific, the determination thereof can be made in the same way as by the formula (2) in the fifth working example.

The terminal cache control unit 58 sends the cache duties of the terminal T4 and of the relay node N1, which are obtained together with the content number of the video, to the cache control unit 12 of the topology management device 1 (an arrowhead A8). The topology management device 1, according to the transmitted cache duties of the terminal T4 and the relay node N1, sets ON or OFF the cache duties of the terminal T4 and the relay node N1 with respect to the transmitted content number, and stores the cache duties (ON/OFF) in the cache duty information 16.

Moreover, the terminal cache control unit 58 transmits the cache duty of the relay node N1 together with the content number to the relay node N1 (an arrowhead A9). The relay node N1 sets ON or OFF the cache duty according to the transmitted cache duty with respect to the transmitted content number, and stores the cache duty (ON or OFF) in the terminal cache duty information 56. The processes from the arrowhead A5 onward are the same as in the case of the FIG. 15.

Moreover, the process of deleting the video with the cache duty being set OFF is executed by the cache deleting unit 53 described in FIG. 3 in the first working example. To be specific, the cache deleting unit 53 is started up at the predetermined timing and deletes the video with the cache duty being set OFF and specified by the content number that is not registered in the relay terminal information.

In the sixth working example, the terminal cache control unit 58 of the terminal T4 requests the relay node N1 to perform the measurements of the bottleneck links from the terminal T4 up to the video distribution server 2, thereby enabling the cache control to be executed in the same way as in the fourth or fifth working example. Moreover, the terminal T4 executes the cache control, whereby the load, on the topology management device 1 which executes managing the connection tree and the free band as in the fourth working example or the fifth working example, is shared with the individual terminal T4.

Seventh Working Example

A seventh working example will be described with reference to FIG. 22. In the sixth working example, the terminal cache control unit 58 of the terminal T4 executes updating the cache duty. Further, the terminal cache control unit 58 in the sixth working example, on the occasion of updating the cache duty, requests the relay node N1 to measure the bottleneck links. In the seventh working example, in place of the processes in the sixth working example, the terminal cache control unit 58 of the relay node N1 executes the update of the cache duty. Moreover, the terminal cache control unit 58 of the relay node N1, on the occasion of updating the cache duty, requests the terminal T4 serving as the requester terminal U1 to measure the bottleneck links. Other configurations and operations in the seventh working example are the same as in the sixth working example. This being the case, the same components as those in the sixth working example are marked with the same numerals and symbols, and their explanations are omitted. Further, the configurations of the terminal and the topology management device 1 in the seventh working example are the same as those in the first through sixth working examples.

Figure 22:
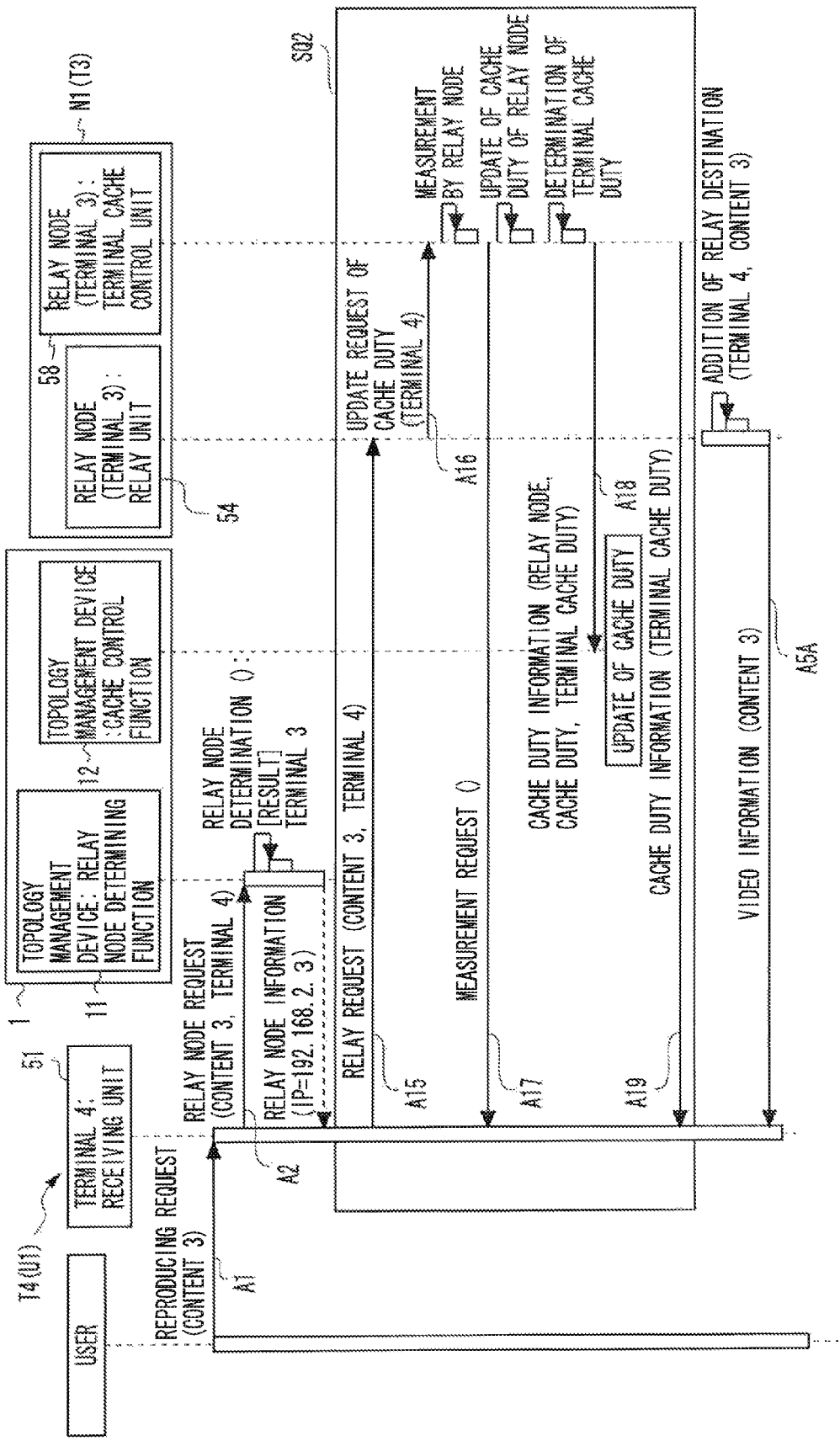
FIG. 22 is a diagram illustrating (part 2) illustrating a processing procedure in which the terminal updates the cache duty.

In FIG. 22, the processes different from those in FIG. 21 are circumscribed by a rectangle SQ2. In FIG. 22 also, similarly to FIG. 21, the topology management device executes the relay node determining process and notifies the terminal T4 of the relay node information in response to the relay node determining request given from the terminal T4 defined as the requester terminal U1. Herein, the terminal T3 is determined to be the relay node N1. Then, the terminal T4 transmits the relay request to the relay node N1 on the basis of the notified relay node information (an arrowhead A15). The relay request contains the content number and the terminal number of the requester terminal T4.

Upon receiving the relay request, the relay unit 54 of the relay node N1 transmits the cache duty update request to the terminal cache control unit 58 of the relay node N1 (an arrowhead A16). The cache duty update request contains the terminal number of the terminal T4 or the address of the terminal T4 on the network 4.

When receiving the cache duty update request, the terminal cache control unit 58 of the relay node N1 obtains the path list of the path connected to the relay node N1 by searching for the relay routers in the direction from the relay node N1 to the video distribution server 2. The search for the relay routers can involve utilizing the same existing software as in the sixth working example. Moreover, the terminal cache control unit 58 of the relay node N1 measures the bottleneck link on the route extending from the relay node N1 up to the video distribution server 2, thereby acquiring the link number of the link serving as the bottleneck link and the band thereof. In the seventh working example, the route extending from the relay node N1 up to the video distribution server 2 corresponds to the first server route.

Next, the terminal cache control unit 58 requests the terminal T4 to measure the band of the link via which the relay requester terminal T4 connects with the host router, to search for the host router and to measure the bottleneck link extending from the host router up to the video distribution server 2 (an arrowhead A17). In the seventh working example, the route extending from the relay requester terminal T4 up to the video distribution server 2 corresponds to the second server route. Then, the terminal T4 measures the band of the link to the host router. Further, the terminal T4 performs the bottleneck link measurement on the route from the terminal T4 up to the video distribution server 2, and acquires the link number of the bottleneck link and the band thereof. Then, the terminal T4 reports a result of the measurement to the relay node N1. As a result, the terminal cache control unit 58 of the relay node N1 acquires the band of the link from the terminal T4 to the host router, the link number of the bottleneck link from the terminal T4 to the video distribution server 2 and the band of the bottleneck link.

The terminal cache control unit 58 of the relay node N1, in the same procedure as in the second, third and fifth working examples, obtains the confluent point between the route from the terminal T4 to the video distribution server 2 and the route from the relay node N1 to the video distribution server 2. Moreover, the terminal cache control unit 58 of the relay node N1, if any one of the two bottleneck links is in the lower position than the confluent point and if the band of this bottleneck link is not sufficient, sets ON the cache duty of the relay node N1. Namely, the relay node N1 continues to retain the cache of the video specified by the content number designated in the relay request.

Further, the terminal cache control unit 58, if both of the two bottleneck links are in the upper stream positions than the confluent point or if the band of the bottleneck link existing in the lower steam position than the confluent point is sufficient, sets OFF the cache duty of the relay node N1. Namely, the relay node N1 sets, in a wait-for-deletion status, the cache of the video specified by the content number designated in the relay request.

Moreover, the terminal cache control unit 58 of the relay node N1 determines the cache duty of the terminal T4. Namely, the terminal cache control unit 58 of the relay node N1, if the sufficient band is provided on the path up to the host router with which the terminal T4 connects, sets ON the cache duty of the terminal T4. Further, the terminal cache control unit 58 of the relay node N1, if the sufficient band is not provided on the path up to the host router with which the terminal T4 connects, sets OFF the cache duty of the terminal T4.

Then, the terminal cache control unit 58 of the relay node N1 transmits, together with the content number of the video, the determined cache duty of the terminal T4 and the determined cache duty of the relay node N1 to the cache control unit 12 of the topology management device 1 (an arrowhead A18). The topology management device 1, according to the transmitted cache duties (ON/OFF) of the terminal T4 and of the relay node N1, with respect to the transmitted content number, sets ON or OFF the cache duty of the terminal T4 and the cache duty of the relay node N1, and stores the cache duties (ON or OFF) in the cache duty information 16.

Moreover, the terminal cache control unit 58 of the relay node N1 transmits the cache duty of the terminal T4 to the terminal T4 (an arrowhead A19). The terminal T4, with respect to the transmitted content number, according to the transmitted cache duty, sets ON or OFF the cache duty and stores the cache duty (ON or OFF) in the terminal cache duty information 56.

Note that the relay unit 54 of the relay node N1, in parallel with the cache duty updating process of the terminal cache control unit 58, adds the requester terminal T4 to the relay terminal information, and further distributes the video thereto (an arrowhead A5A).

Moreover, the process of deleting the video of which the cache duty is set OFF is executed by the cache deleting unit 53 explained in FIG. 3 in the first working example. To be specific, the cache deleting unit 53 is started up at the predetermined timing and deletes the video with the cache duty being set OFF and specified by the content number that is not registered in the relay terminal information.

As discussed above, in the same way as in the sixth working example, the cache control is executed on the terminal serving as the relay node N1, whereby the load, on the topology management device 1 which executes managing the topology and the free band, is shared with the individual relay node N1.

<<Effects in First through Seventh Working Examples>>

The first through seventh working examples attain the following effects. The terminal, which has once relayed the contents, can delete all the caches at the stage of finishing the relay-distribution. The terminal, which has none of the cache, comes to have the decreased cache capacity and no necessity for the new distribution and can therefore reduce the terminal load.

It is controlled whether the terminal holds or deletes the cache according to the network topology and the free band information, thereby enabling the cache to be deleted while avoiding the concentration of the load on the video distributor.

As in the third working example, the sixth working example or the seventh working example, it is controlled whether the terminal itself holds or deletes the cache, whereby the function-concentrated server like the video distribution server 2 etc can reduce the cost for collecting the network information for controlling the caches.

<<Readable-by-Computer Recording Medium>>

A program for making a computer, other machines and devices (which will hereinafter be referred to as the computer etc) realize any one of the functions can be recorded on a recording medium readable by the computer etc. Then, the computer etc is made to read and execute the program on this recording medium, whereby the function thereof can be provided.

Herein, the recording medium readable by the computer etc connotes a recording medium capable of storing information such as data and programs electrically, magnetically, optically, mechanically or by chemical action, which can be read from the computer etc. Among these recording mediums, for example, a flexible disc, a magneto-optic disc, a CD-ROM, a CD-R/W, a DVD, a Blu-ray disc, a DAT, an 8 mm tape, a memory card such as a flash memory, etc are given as those removable from the computer. Further, a hard disc, a ROM (Read-Only Memory), etc are given as the recording mediums fixed within the computer etc.

According to the management device 1, it is feasible to restrain the resources from being used on the terminal side while reducing the concentration of the load on the distributor or the network.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A non-transitory computer-readable recording medium storing executable instructions of a computer program that, when executed by a computer, causes the computer to control a system including a server to distribute information and a plurality of terminals to receive the information as a requester terminal, and each capable of distributing the received information as a relay terminal, the instructions causing the computer to perform:
   determining, in response to a request given from a requester terminal included in the plurality of terminals for determining a request target information distributor to distribute request target information requested by the requester terminal, any one of the server and the relay terminal retaining the request target information as the request target information distributor;
   determining whether the request target information can be held on the requester terminal and whether the request target information can be held on the relay terminal determined as the request target information distributor, based on a bandwidth availability of a route which connects the server, the relay terminal and the requester; and
   indicating to the relay terminal or the requester terminal whether the request target information can be deleted or not after having the request target information distributed.

2. The non-transitory computer-readable recording medium according to claim 1, further causing the computer to perform collecting a route status including a location of a router and a band on the route, wherein the indicating includes:
   instructing, when a next router connection path extending from the requester terminal to a requester next router located first among routers on a server route extending from the requester terminal to the server has a free band for distributing the request target information, the requester terminal to disable the request target information from being deleted; and
   instructing, whereas when the next router connection path does not have the free band, the requester terminal to enable the request target information to be deleted.

3. The non-transitory computer-readable recording medium according to claim 1, further causing the computer to perform collecting a route status including a location of a router and a band on the route, wherein the indicating includes:
   determining a confluent point between a first server route extending from the requester terminal to the server and a second server route extending from the relay terminal to the server;
   instructing the relay terminal to enable the request target information to be deleted when both of a first segmental path extending to the confluent point from a requester next router located first among routers on the first server route and a second segmental path extending to the confluent point from a relay next router located first among routers on the second server route have free bands for distributing the request target information; and
   instructing the relay terminal to disable the request target information from being deleted when at least one of the first segmental path and the second segmental path does not have the free band.

4. The non-transitory computer-readable recording medium according to claim 1, further causing the computer to perform acquiring a first bottleneck link which has a narrowest band among links on a path extending to the server from a requester next router located first among routers on a first server route extending from the requester terminal to the server and a second bottleneck link which has the narrowest band among links on a path extending to the server from a relay next router located first among routers on a second server route extending from the relay terminal to the server, wherein the indicating includes:
   instructing the relay terminal to disable the request target information from being deleted in the case of satisfying at least one of
   a condition (1) that the first bottleneck link exists closer to the requester terminal side than a confluent point between the first server route and the second server route but does not have a free band enabling the request target information to be distributed, and
   a condition (2) that the second bottleneck link exists closer to the relay terminal side than the confluent point between the first server route and the second server route but does not have the free band enabling the request target information to be distributed; and
   instructing the relay terminal to enable the request target information to be deleted when neither the first bottleneck link satisfying the condition (1) nor the second bottleneck link satisfying the condition (2) exists.

5. A management device to control a system including a server to distribute information and a plurality of terminals to receive the information as a requester terminal, and each capable of distributing the received information as a relay terminal, the management device comprising:

processor; and a storage device storing executable instructions that, when executed by the processor, cause the processor to perform:

determining, in response to a request given from a requester terminal included in the plurality of terminals for determining a request target information distributor to distribute request target information requested by the requester terminal, any one of the server and the relay terminal retaining the request target information as the request target information distributor;

determining whether the request target information can be held on the requester terminal and whether the request target information can be held on the relay terminal determined as the request target information distributor, based on a bandwidth availability of a route which connects the server, the relay terminal and the requester terminal; and indicating to the relay terminal or the requester terminal whether the request target information can be deleted or not after having the request target information distributed.

6. The management device according to claim 5, the executable instructions further cause the processor to perform collecting a route status including a location of a router and a band on the route, wherein the indicating includes:

instructing, when a next router connection path extending to a requester next router located first among routers on a server route extending from the requester terminal to the server has a free band for distributing the request target information, the requester terminal to disable the request target information from being deleted and instructs, whereas when the next router connection path does not have the free band, the requester terminal to enable the request target information to be deleted.

7. The management device according to claim 5, the executable instructions further cause the processor to perform collecting a route status including a location of a router and a band on the route, wherein the indicating includes:

determining a confluent point between a first server route extending from the requester terminal to the server and a second server route extending from the relay terminal to the server, instructing the relay terminal to enable the request target information to be deleted when both of a first segmental path extending to the confluent point from the requester next router located first among routers on the first server route and a second segmental path extending to the confluent point from a relay next router located first among routers on the second server route have free bands for distributing the request target information, and instructing the relay terminal to disable the request target information from being deleted when at least one of the first segmental path and the second segmental path does not have the free band.

8. The management device according to claim 5, the executable instructions further cause the processor to perform acquiring a first bottleneck link among links on a path which has a narrowest band extending to the server from a requester next router located first among routers on a first server route extending from the requester terminal to the server and a second bottleneck link which has the narrowest band among links on a path extending to the server from a relay next router located first among routers on a second server route extending from the relay terminal to the server, wherein the indicating includes:

instructing the relay terminal to disable the request target information from being deleted in the case of satisfying at least one of a condition (1) that the first bottleneck link exists closer to the requester terminal side than a confluent point between the first server route and the second server route but does not have a free band enabling the request target information to be distributed, and a condition (2) that the second bottleneck link exists closer to the relay terminal side than the confluent point between the first server route and the second server route but does not have the free band enabling the request target information to be distributed, and instructing the relay terminal to enable the request target information to be deleted when neither the first bottleneck link satisfying the condition (1) nor the second bottleneck link satisfying the condition (2) exists.

* * * * *